(12) United States Patent
Noriega et al.

(10) Patent No.: US 7,966,236 B2
(45) Date of Patent: Jun. 21, 2011

(54) METHOD AND SYSTEM FOR REAL TIME MARGIN CALCULATION

(75) Inventors: Carla Noriega, Paramus, NJ (US);
Elizabeth L Pedersen, Monroe, NJ (US); David Christensen, Jersey City, NJ (US); Mark Lipschutz, Howard Beach, NY (US); Andre Kupelian, Levittown, NY (US); Keyur Patel, Jersey City, NJ (US); Takshing Andy Chow, Brooklyn, NY (US); Olga Konratev, Fair Lawn, NJ (US); Ellen Brill, Passaic, NJ (US); Angelo Diamantidis, North Plainfield, NJ (US)

(73) Assignee: UBS Financial Services Inc., Weehawken, NJ (US)

( * ) Notice: Subject to any disclaimer, the term of this patent is extended or adjusted under 35 U.S.C. 154(b) by 1464 days.

(21) Appl. No.: 10/885,321

(22) Filed: Jul. 7, 2004

(65) Prior Publication Data
US 2006/0010064 A1 Jan. 12, 2006

(51) Int. Cl.
*G06Q 40/00* (2006.01)
(52) U.S. Cl. ............ 705/35; 705/30; 705/36 R; 705/37; 705/41
(58) Field of Classification Search ............ 705/35–45; 707/4
See application file for complete search history.

(56) References Cited

U.S. PATENT DOCUMENTS

| | | | | |
|---|---|---|---|---|
| 4,774,663 A | * | 9/1988 | Musmanno et al. | 705/36 R |
| 5,144,115 A | * | 9/1992 | Yoshida | 705/41 |
| 6,064,985 A | * | 5/2000 | Anderson | 705/36 R |
| 6,493,717 B1 | * | 12/2002 | Junkin | 707/102 |
| 6,847,942 B1 | * | 1/2005 | Land et al. | 705/30 |
| 6,938,009 B1 | * | 8/2005 | Herbst et al. | 705/36 R |
| 7,275,046 B1 | * | 9/2007 | Tritt et al. | 705/36 R |
| 2002/0035531 A1 | * | 3/2002 | Push | 705/36 |
| 2002/0052818 A1 | * | 5/2002 | Loveland | 705/36 |
| 2002/0077943 A1 | * | 6/2002 | Bunyan et al. | 705/35 |
| 2002/0077947 A1 | * | 6/2002 | Ward et al. | 705/36 |
| 2002/0087457 A1 | * | 7/2002 | Madeley et al. | 705/37 |
| 2005/0027640 A1 | * | 2/2005 | Goldenberg et al. | 705/37 |

FOREIGN PATENT DOCUMENTS

WO  WO 03/023679  *  3/2003

OTHER PUBLICATIONS

Danielson, Arnold G. "Financial Modernization: A Blueprint for Local Banks." Banking Policy Report. V18, N18. Sep. 20, 1999.*

* cited by examiner

*Primary Examiner* — Charles R Kyle
*Assistant Examiner* — Robert R Niquette
(74) *Attorney, Agent, or Firm* — Proskauer Rose LLP

(57) ABSTRACT

Methods and systems for real time margin management are provided. A margin inquiry request from a user is processed in real time. Such a margin inquiry request may include a real time on-demand margin inquiry. In addition, a margin inquiry request may also correspond to a hypothetical margin inquiry.

14 Claims, 27 Drawing Sheets

Copyright 2003 UBS Financial Services Inc. All rights reserved.

Copyright 2003 UBS Financial Services Inc. All rights reserved.

Figure 10(b)

Copyright 2003 UBS Financial Services Inc. All rights reserved.

Hypothetical Margin Calculator – Single Account Query Result

| BACK | FORWARD | STOP | REFRESH | HOME | SEARCH | FAVORITES | HISTORY | MAIL | PRINT |

ADDRESS

IO | 10002 | YA | | GO | | | | | Margin Page

WireCode  Account Number  FA Number
Name: Ops Project Group Test Account    King    P-PREM HH  RMA  Phone $ Address   Date as of: 03/05/2002
                                        Prices: ● Intraday ○ End of Day           Time as of: 15:34:00

New Query    Multiple Account Query

Proposed Transactions:
Sell 11 Shares of DIS at market (23.25)    Remove ☐

Margin Summary

| Requirement Type | Long | Short | Option | Type | Trade Date Balance |
|---|---|---|---|---|---|
| Regulation T | 5,605 | | | 2 - Margin | -7,940.11 |
| Maintenance | 3,357 | | | TOTAL | -7,940.11 |

SMA: 196,076       Federal Call: 0      Money Fund: 0
Buying Power: 0    Liquid Equity: 3,271.00   Funds Available: 0
T2 Equity %: 29    Equity Call: 0

House Call / House Excess: -86
Cash Account Excess: 0
NYSE Call / NYSE Excess: 468.25

| Symbol | Security Description | Loc | Action | TD Position | | Price | | Value | Equity | Market Value | House / Reg T | | Acct Type |
|---|---|---|---|---|---|---|---|---|---|---|---|---|---|
| | | | | Action Qty | | | Action Price | | | | % | $ | |
| AOL | AOL TIME WARNER INC | Box | | 370.000 | | 24.000 | | 8,880.00 | 3,271.00 | 11,211.00 | 30 | 2,664 | 2 |
| | | | | | | | | | | | 50 | 4,440 | |
| ATHMQ | AT HOME CORP SER A | Box | | 1100.000 | | .006 | | 6.00 | | 0 | 100 | 6 | 2 |
| | | | | | | | | | | | 50 | 3 | |
| DIS | WALT DISNEY CO | Box | | 100.000 | | 23.250 | | 2,325.00 | | 0 | 30 | 687 | 2 |
| | | | | | | | | | | | 50 | 1,162 | |
| Portfolio Totals: | | | | | | | | 11,211.00 | | | 3,357 / 5,605 | | |
| | Symbol Lookup | | | | | | | | | | | | |
| | Symbol Lookup | | | | | | | | | | | | |
| | Symbol Lookup | | | | | | | | | | | | |

DISCLAIMER STATEMENT: THE WHAT IF MARGIN CALCULATOR IS A TOOL USED TO RUN HYPOTHETICAL QUERIES, ETC.

Figure 10(c)

Copyright 2003 UBS Financial Services Inc. All rights reserved.

| BACK | FORWARD | STOP | REFRESH | HOME | SEARCH | FAVORITES | HISTORY | MAIL | PRINT |

ADDRESS
GO LINKS

Hypothetical Margin Calculator – Multiple Account Results Screen

WireCode ___ Account Number ___ FA Number ___
User ID: CE01644    Date as of: 03/05/02
Time as of: 15:34:00    Prices: ● Intraday ○ End of Day    [Refresh]    [Download Report]

Proposed Transaction:
Sell all holders of MDMN at market (.003)

| ACCOUNT | SHORT NAME | FA | HOUSE CALL/ EXCESS | SMA | T2 EQUITY % | LIQUID EQUITY | BUYING POWER | REG T CALL | EQUITY CALL | CALL AGE |
|---|---|---|---|---|---|---|---|---|---|---|
| 1000021 | Smith | YA | -5,553 | 0 | 40% | 47,495 | 0 | 0 | 0 | 2 |
| 1000022 | Jones | 13 | 156,576 | 156,099 | 100% | 21,022 | 312,198 | 0 | 0 | |
| 1000023 | Brown | 47 | 1,200 | 0 | 100% | 10,001 | 0 | 0 | 0 | |
| 1000024 | Doe | 07 | 6,749 | 0 | 0% | 24,607 | 0 | 0 | 0 | |
| 1000025 | White | | 172,697 | 85,850 | 100% | 299,866 | 160,650 | 0 | 0 | |
| 1000026 | Johnson | 32 | 16,601 | 45,858 | 66% | 80,395 | 55,338 | 0 | | |
| 1000027 | Long | 25 | 1,892 | 2,312 | 100% | 7,804 | 4,624 | 0 | 0 | |
| 1000028 | Williams | 07 | 12,829 | 10,601 | 100% | 28,200 | 21,202 | 0 | 0 | |
| | | | -143 | 0 | 29% | 3,428 | 0 | 0 | 0 | 0 |

Figure 10(e)

METHOD AND SYSTEM FOR REAL TIME MARGIN CALCULATION

BACKGROUND OF THE INVENTION

1. Field of Invention

The present invention relates to a system and method for managing margin accounts. More specifically, the present invention relates to a system and method for real time margin account management.

2. Discussion of Related Art

Certain types of investments may be margined or serve as the basis for margin account collateral finds. Margin investment may be subject to various regulations or rules. The federal government may impose different regulations on each individual margin account. For instance, for a short sale using margins, the federal government may require a certain minimum percentage of equity to be held in the associated account. A long sale or an option transaction using margins may invoke different requirements. In addition, an investment institution where margin accounts are held may also impose some in-house rules that may further restrict the activities to be performed on margin accounts.

Margin related investment often presents relatively higher risk. Opportunities to success often rely on correct estimation of where the market is heading and at what time frame. Slight differences in price associated with a security being bought or sold at a certain time may play a crucial role in determining gains. In addition, computations of margins are often complex and adaptive with respect to changing market, regulations, and rules. Investment decisions regarding margin investment are often made based on a snap shot situation of a dynamic market.

SUMMARY OF THE INVENTION

In accordance with at least one embodiment of the invention, systems and methods are provided to manage client margin accounts. Specifically, methods and systems are provided to enable real time on-demand margin inquiry and computation of margin requirements based on a hypothetical scenario.

In some embodiment, a user may inquire, through a real time interface, margin account status using a specified security price. A user may be, for example, an investor, a financial agent representing a group of investors, or a corporate official. The specified price may be the current market price (or intraday price), the price from the end of the previous day, or an arbitrary price indicated by the requesting user. A market price for a security may be retrieved from an intraday database which may record current market prices of various securities on a regular basis. A market price may also be acquired through a real time connection to an appropriate source.

Each on-demand inquiry may specify various parameters that are used to generate a real time response to the inquiry. Such parameters may include, but are not limited to, a price used to compute the margin requirements for the accounts involved in the inquiry. An on-demand margin inquiry may be requested against a single account or, alternatively, simultaneously against a plurality of accounts. For example, an individual investor may inquire as to the current position of his/her margin account. A financial agent who represents a plurality of clients may inquire as to the current positions of all of his/her clients' accounts. A corporate officer may also send an on-demand inquiry request for all margin accounts managed by the corporation.

In at least one embodiment, a user may also inquire, in real time, regarding a margin status arising from a hypothetical scenario. Such a hypothetical scenario may be associated with situations, including but are not limited to, a proposed transaction, a change in margin management policy, a change in price of a certain security, or a change in the value of an index. A hypothetical margin inquiry may be a corporate level margin inquiry or a client level margin inquiry. A corporate level margin inquiry may be initiated by a corporate officer to assess the impact of a proposed (or hypothetical) corporate level change in a policy, in a security price, or in an index value. The proposed change may be used to compute margins against relevant accounts and such resultant hypothetical margins may then be used to assist the assessment of the impact of the change. In case of a change in an index value, the prices of the securities that contain the index may be appropriately adjusted based on certain criteria such as the index's proportion with respect to the security.

In at least one embodiment, a client level margin inquiry may include an inquiry about the impact on the margin status resulting from a hypothetical transaction. Such a proposed transaction may be a sell or a buy transaction associated with certain product(s) at some specified price(s). A price may be determined based on a market (intraday) price, the price as of the end of the previous day, or an arbitrary price based on some condition. The proposed transaction may be applied in computing the resultant margins and the impact assessed based on the resultant margins.

In at least one embodiment, a client level margin inquiry may also include an inquiry about possible sale(s) that can be carried out to cure a margin violation or to satisfy a certain requirement. A violation amount may be identified in order to determine a proposed sale. A proposed sale is expressed as the product(s) to sell and the quantity to be sold to satisfy the violation amount. A client level margin inquiry may be initiated by a user who may be an investor, a financial agent representing a plurality of clients, or a corporate officer. A hypothetical margin inquiry, including both corporate level and client level margin inquiries, may be requested for a single account or simultaneously against a plurality of accounts.

Further, a framework or a system configuration may be provided to facilitate a margin management service. The framework may be configured to enable a service provider to offer one or more types of margin management services to a plurality of clients. The service provider may offer different functions for real time margin management. It may also combine real time margin management functionalities with batch mode margin management functionalities. The framework may support different interface means through which a user may interact with a margin management service to perform different inquiries or transactions. In addition, the framework may also provide a backend support for data storage, retrieval, and processing and the capability of integrating the margin management services with other services such as accounting and data management. Furthermore, the framework may be configured to enable a service to generate reports in compliance with governmental regulations.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10(b) is an illustrative query interface for a hypothetical margin inquiry for a single account according to an embodiment;

FIG. 10(c) illustrates an interface for displaying the result of a single account hypothetical margin inquiry according to an embodiment;

FIG. 10(e) illustrates the hypothetical margin inquiry result for a multiple account inquiry produced after executing the proposed hypothetical transaction across all accounts under a financial agent;

DETAILED DESCRIPTION

Figure 1:
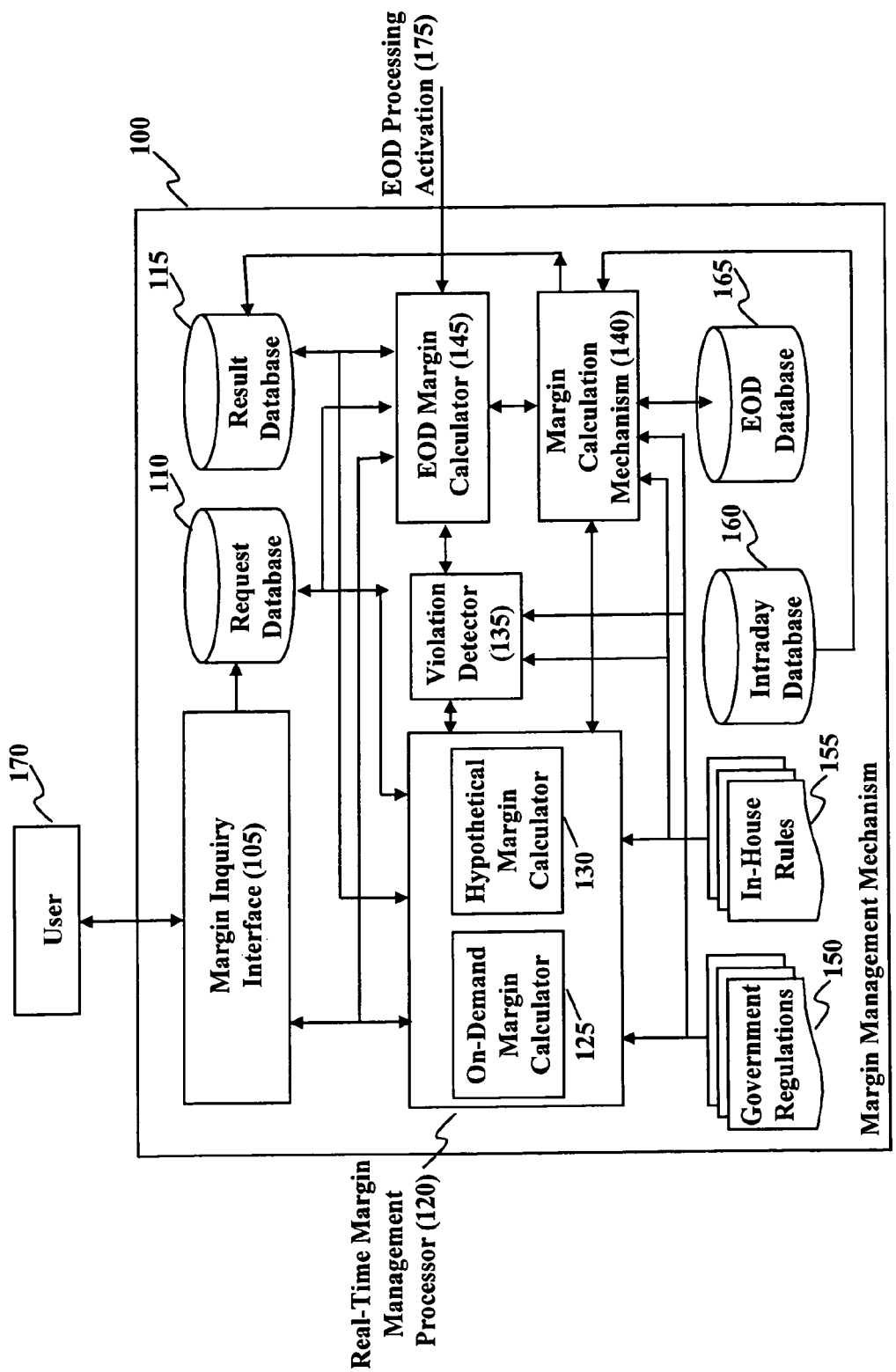
FIG. 1 depicts a margin management mechanism according to at least one embodiment.

FIG. 1 depicts a margin management mechanism 100 according to at least one embodiment of the present invention. The margin management mechanism 100 may comprise a margin inquiry interface 105, a real time margin management processor 120, an End Of Day (EOD) margin calculator 145, a violation detector 135, and a margin calculation mechanism 140. The margin management mechanism 100 may support both real time and batch margin computations. Through the margin inquiry interface 105, a user 170 may send a request inquiring about certain margins related measures and receive real time response. The user 170 may also issue a request, through the same interface, to perform margin computations in a different mode such as a batch mode at the end of each day.

If an inquiry request from the user 170 corresponds to a real time inquiry, the real time margin management processor 120 may process the request and respond to the user's request in real time. If an inquiry request from the user 170 corresponds to batch computation of margins, the EOD margin calculator 145 may process and respond to the request. Both the real time margin management processor 120 and the EOD margin calculator 145 may process a corresponding inquiry request. Each may construct an appropriate margin computation request according to the processed inquiry request and invoke the margin calculation mechanism 140 to perform specific margin computations required by the request.

Margins may be computed for one or more accounts. Depending on specific accounts, different regulations/rules may apply. Regulations may include governmental regulations 150 and rules may include in-house rules 155. The former may be issued by the government, which governs the determination of margin requirements and other restrictions applied to different types of accounts. The latter may involve in-house policies initiated by a specific investment institution such as an investment firm or a bank. Different accounts may be governed by different regulations or rules. Therefore, when requesting margin computations, the real time margin management processor 120 may specify different regulations or rules to be applied in the margin computation with respect to different accounts. The margin calculation mechanism 140 may also invoke different regulations/rules for specific accounts for which margins are computed.

In at least one embodiment, the real time margin management mechanism 120 may further include an on-demand margin calculator 125 and a hypothetical margin calculator 130. The on-demand margin calculator 125 may be responsible for processing a real time on-demand margin inquiry. The hypothetical margin calculator 130 may be responsible for processing a real time hypothetical margin inquiry. An on-demand margin inquiry may be related to a query by which the user 170 may request certain margin computations to be carried out for one or more accounts using some specified prices. An on-demand margin request may request computation of margins against a single or multiple accounts.

A hypothetical margin inquiry may be related to a query by which the user 170 may issue a request to compute margins in order to assess the impact to margin requirements if some hypothetical scenarios were to occur. For example, a hypothetical scenario may involve one or more hypothetical transactions using certain hypothetical prices. Other exemplary hypothetical scenarios may include a change in the value of an index or a change in in-house rules related to margin requirements. Depending on the request, margins may be computed for a single account or multiple accounts.

In addition to computing margins in real time upon a request, margin computation may also be performed at the end of a particular period. For example, margins may be computed at the end of each day when the market is closed. Such margin computation or process may be termed EOD processing. The EOD processing may be performed by the EOD margin calculator 145. Its processing may be dynamically triggered by the user 170 through the margin inquiry interface 105. It may also be programmed to be activated automatically at the end of each of such period (fixed interval) through an EOD processing activation signal 175.

Margin computation may involve determining whether a violation has occurred. Violation detection may be performed by the violation detector 135. Such a violation determination may be invoked either during real time margin inquiry processing or EOD processing. For example, in order to respond to a real time margin inquiry to compute margins using a hypothetical scenario, violation detection may be activated by the real time margin management mechanism 120 to see whether a hypothetical transaction would lead to a violation. Similarly, at end of each day, when trades are actually carried out, violation processing may be called to determine whether a violation occurs. Since different accounts may be governed by different regulations/rules, regulations or rules to be applied to compute violations for accounts may differ.

In computing margins, prices of different securities may need to be specified. Such prices may be determined according to a hypothetical scenario specified by the user 170. They may also be determined based on dynamic market prices (or intraday prices) or the prices as of the end of the previous day. The intraday price may be acquired through real time access to the market (not shown), or there may be an intraday database 160 recording security prices of the current market. For instance, the market prices of securities may be tracked every 10 seconds and then stored in the intraday database 160. There may also be an EOD database 165 that records information related to end of day processing such as security trading prices at the end of each day.

Depending on a margin inquiry request, the margin calculation mechanism 140 may compute margins using certain specified security prices. For example, in a hypothetical margin inquiry, the user 170 may indicate to use intraday prices to assess the impact of a hypothetical transaction. As another example, the user 170 may request an on-demand margin inquiry using security prices as of the end of the previous day. End of day processing scheduled to be performed after the market is closed each day may always use the prices as of the current day. Based on such specifications, the margin calculation mechanism 140 computes margins using prices retrieved from either the intraday database 160 or the EOD database 165.

There may be different modes of communications between the margin calculation mechanism 140 and the mechanisms that invoke the margin calculation mechanism 140 to compute margins (e.g., the on-demand margin calculator 125, the hypothetical margin calculator 130, and the EOD margin calculator 145. In one embodiment, the communication may be direct. That is, to activate the margin calculation mechanism 140 to perform margin computations, the invoking mechanism may trigger the margin calculation mechanism 140 directly. Alternatively, the mechanism may send a request to a database 110 that records all requests. The margin calculation mechanism 140 may retrieve a request from the request database 110 and carry out the requested operation before storing the computed margin result in a result database 115. The requesting mechanism may then retrieve the corresponding result from the result database 115. Communication in this alternative mode may be facilitated using request identifications so that corresponding requests and results may be uniquely identified.

Figure 2:
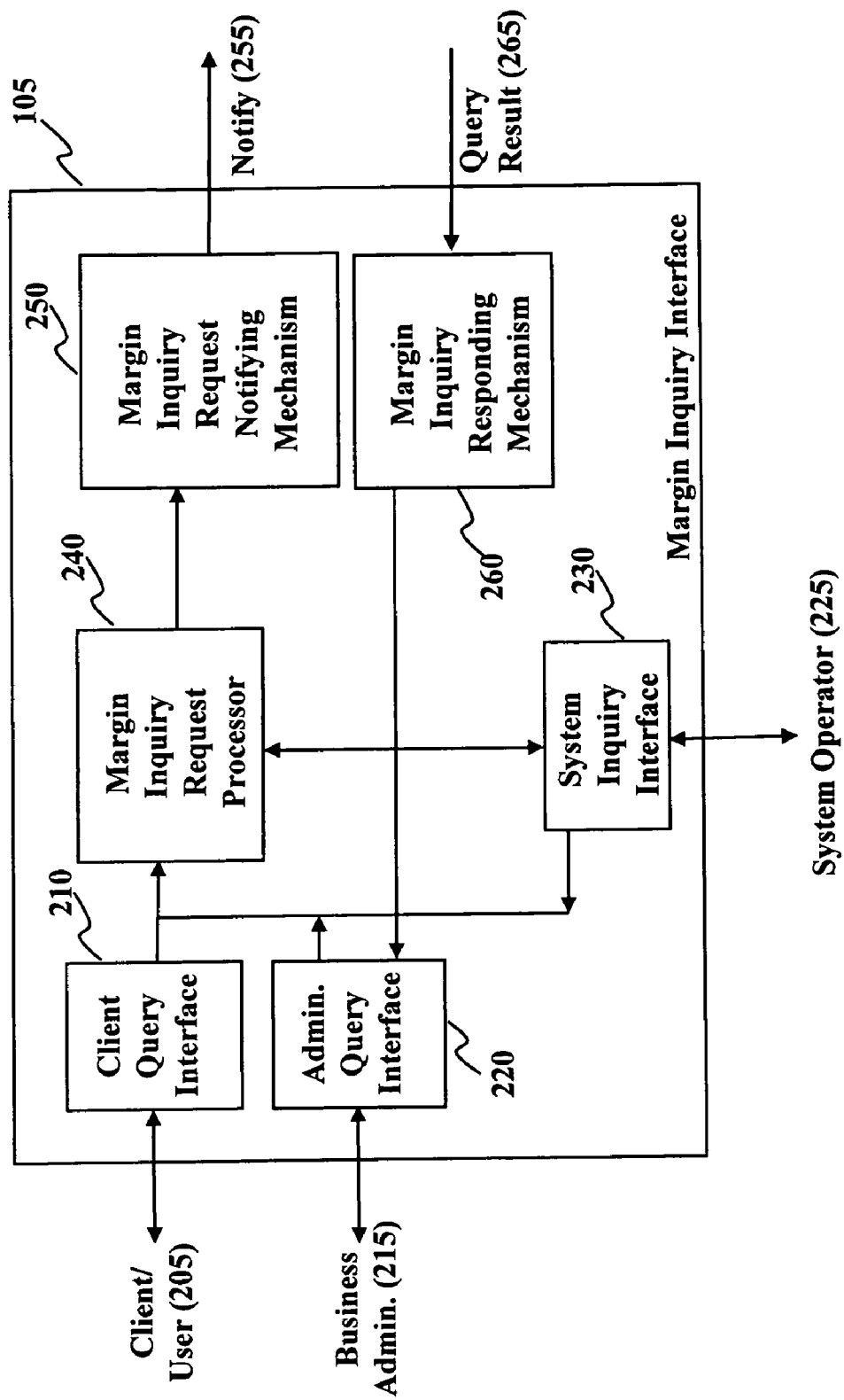
FIG. 2 describes an exemplary embodiment of a margin inquiry interface that facilitates interactions with a user according to at least one embodiment.

FIG. 2 describes an exemplary embodiment of the margin inquiry interface 105 that facilitates the interactions with the user 170 according to at least one embodiment. The user 170 may include a client 205, a business administrator 215, or a system operator 225. Different users may interact with the margin management mechanism 100 for different purposes and in different manners. For instance, the client 205 may include an individual investor or a financial agent representing one or more investors. An individual investor may check the underlying portfolio at arbitrary times using intraday prices. A financial agent may issue a request to assess the impact of a hypothetical transaction on the account of a particular client.

A business administrator 215 may use the margin management mechanism 100 for different purposes. For example, a corporate level administrator may request the margin management mechanism 100 to assess the impact of a change in some in-house rules. In addition, such a business administrator may also want to assess the impact caused by a change in the value of a particular index on all accounts. Furthermore, such a business administrator may sometimes also want to see the impact of a change of a security price on a group of accounts. The interface(s) provided to such business administrators to facilitate such inquiries may be different from those provided to a client 205.

Furthermore, a system operator 225 may use the margin management mechanism 100 to compute margins for some other different purposes. For instance, a system operator may request the margin management mechanism 100 to compute certain margins in order to debug the system. For such purposes, the interface provided to support such a need may be different.

To support different types of users, the margin inquiry interface 105 may facilitate interfaces that may be appropriate for different users with respect to their different needs. The margin inquiry interface 105 may comprise a client query interface 210, an administrative query interface 220, and a system inquiry interface 230. Each of these interfaces may facilitate the interactions that are appropriate for the intended purposes. For example, the administrative query interface 220 may provide the interfaces that allows a business administrator 215 to enter proposed in-house rules, proposed security prices, or proposed value of a particular index. Such changes may not be allowed, for example, if the user is a client or a financial agent who may merely like to see the impact of a hypothetical sale of a certain security at a certain price on a single account.

The margin inquiry interface 105 may further comprise a margin inquiry request processor 240 and a margin inquiry responding mechanism 260. The margin inquiry request processor 240 may form a margin computation request with information specified by a requester (e.g., a client 205, a business administrator 215, or a system operator 225) through appropriate interfaces. Such a margin computation request is sent to an appropriate mechanism (e.g., the real time margin management mechanism 120 or the EOD margin calculator 145). When the requested margins are computed, the margin inquiry responding mechanism 260 retrieves a query result 265 and directs such result to appropriate interfaces so that the result may be displayed to the requester.

Alternatively, the margin inquiry interface 105 may also include a margin inquiry request notifying mechanism 250, which notifies 255 an appropriate mechanism (e.g., the real time margin management mechanism 120 or the EOD calculation mechanism 145) of a request for computing margins. Such a notification may contain the information related to the inquiry so that when the notification is received, the corresponding mechanism may directly compute what is requested. In a different embodiment, such a notification may not include information specific to the inquiry request and may merely inform a corresponding mechanism that there is a request. In this case, the request itself including necessary information indicating how the margins should be computed may be stored at an agreed location (e.g., the request database 110) which may be retrieved based on some identification.

Figure 3:
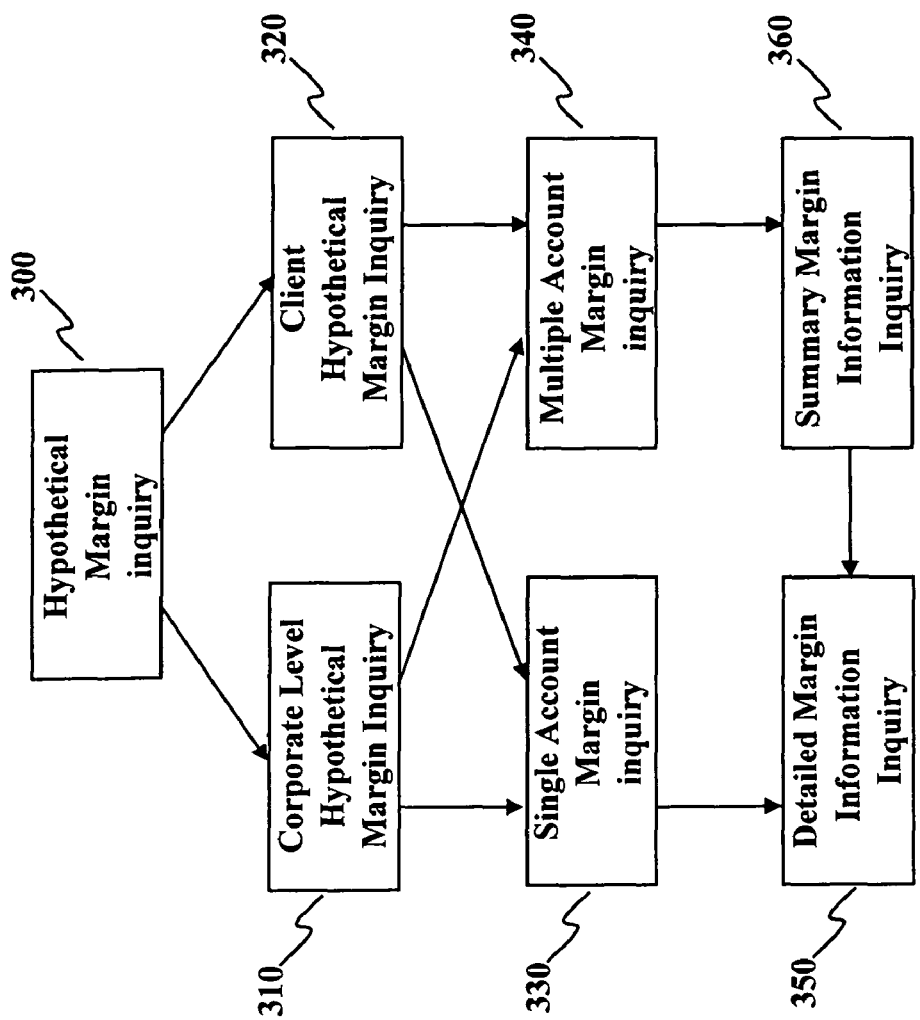
FIG. 3 illustrates exemplary types of hypothetical margin inquiries according to at least one embodiment.

FIG. 3 illustrates exemplary types of hypothetical margin inquiries according to at least one embodiment. A hypothetical margin inquiry 300 may correspond to a corporate level hypothetical margin inquiry 310 or a client level hypothetical margin inquiry 320. Here, the corporate level hypothetical margin inquiry 310 may be initiated by a business administrator 215. The client level hypothetical margin inquiry 320 may be initiated by an individual investor or a financial agent 205.

Both the corporate level hypothetical margin inquiry 310 and the client level hypothetical margin inquiry 320 may be directed at either a single account, i.e., a single account margin inquiry 330, or a plurality of accounts, i.e., a multiple account margin inquiry 340. That is, a hypothetical inquiry may include a corporate level inquiry directed at a single account, a corporate level inquiry directed at a group of accounts, a client level inquiry directed at a single account, and a client level inquiry directed at a group of accounts. Some of the inquiries may be made in the form of a detailed margin information report inquiry 350. Other inquiries may be made in the form of a summary margin information inquiry 360. For example, a single account margin inquiry 330 may be made to obtain detailed margin information. A multiple account margin inquiry 340 may be made to obtain summary margin information. Such an option may affect the results received as a response to the query.

Figure 4:
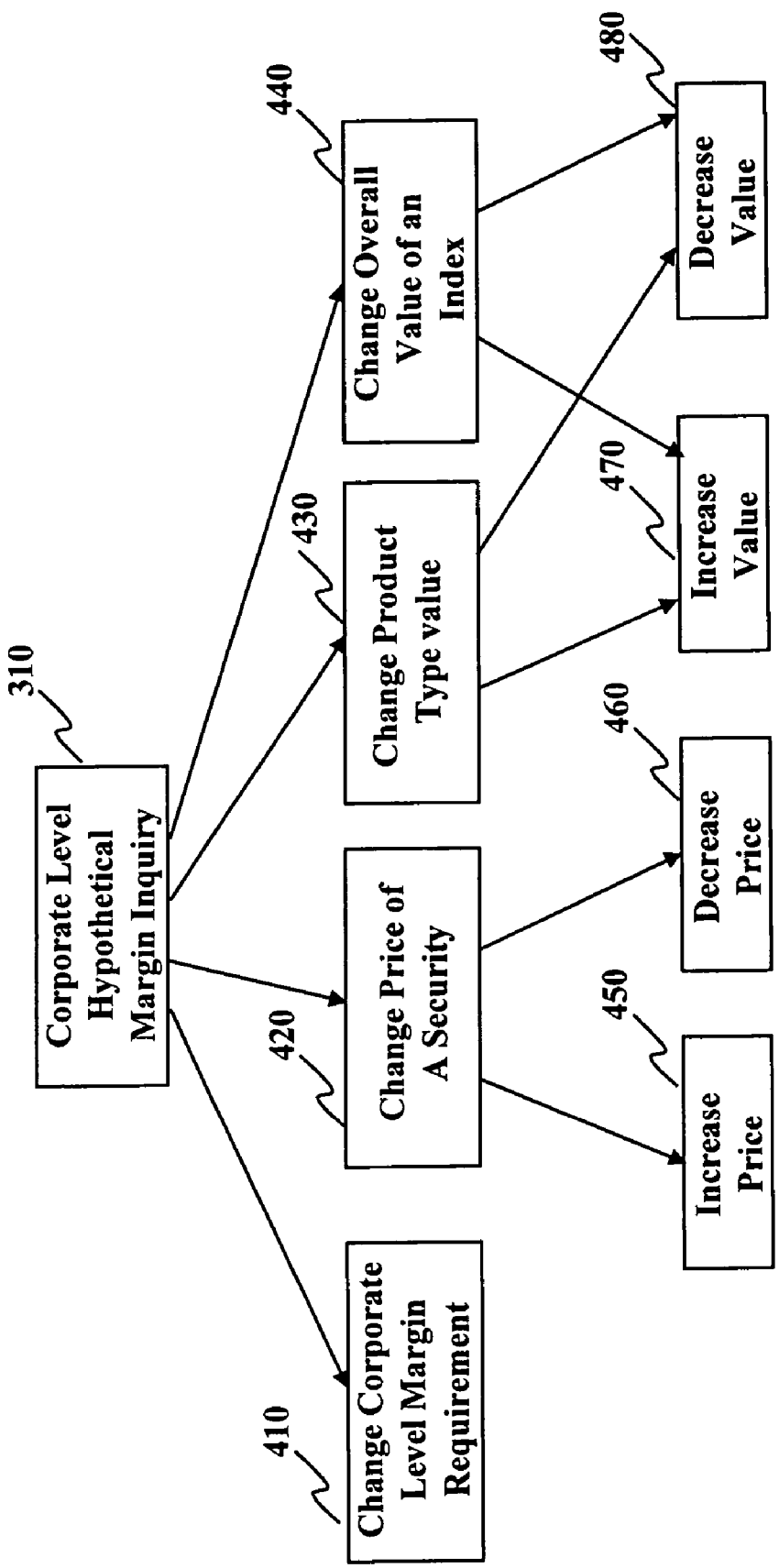
FIG. 4 illustrates exemplary types of corporate level hypothetical margin inquiries according to at least one embodiment.

FIG. 4 illustrates exemplary types of corporate level hypothetical margin inquiries according to at least one embodiment. A corporate level hypothetical margin inquiry 310 may include an inquiry addressing the impact on different margin accounts due to a change of corporate level margin requirement 410, a change to a security price 420, a change to the value of a particular product 430 (e.g., a bond or a mutual fund), and a change to the overall value of an index 440. A change made to a security price may correspond to a price increase 450 or decrease 460. A change made to the value of a particular product type or to an index may similarly involve either an increase in value 470 or a decrease in value 480.

Figure 5:
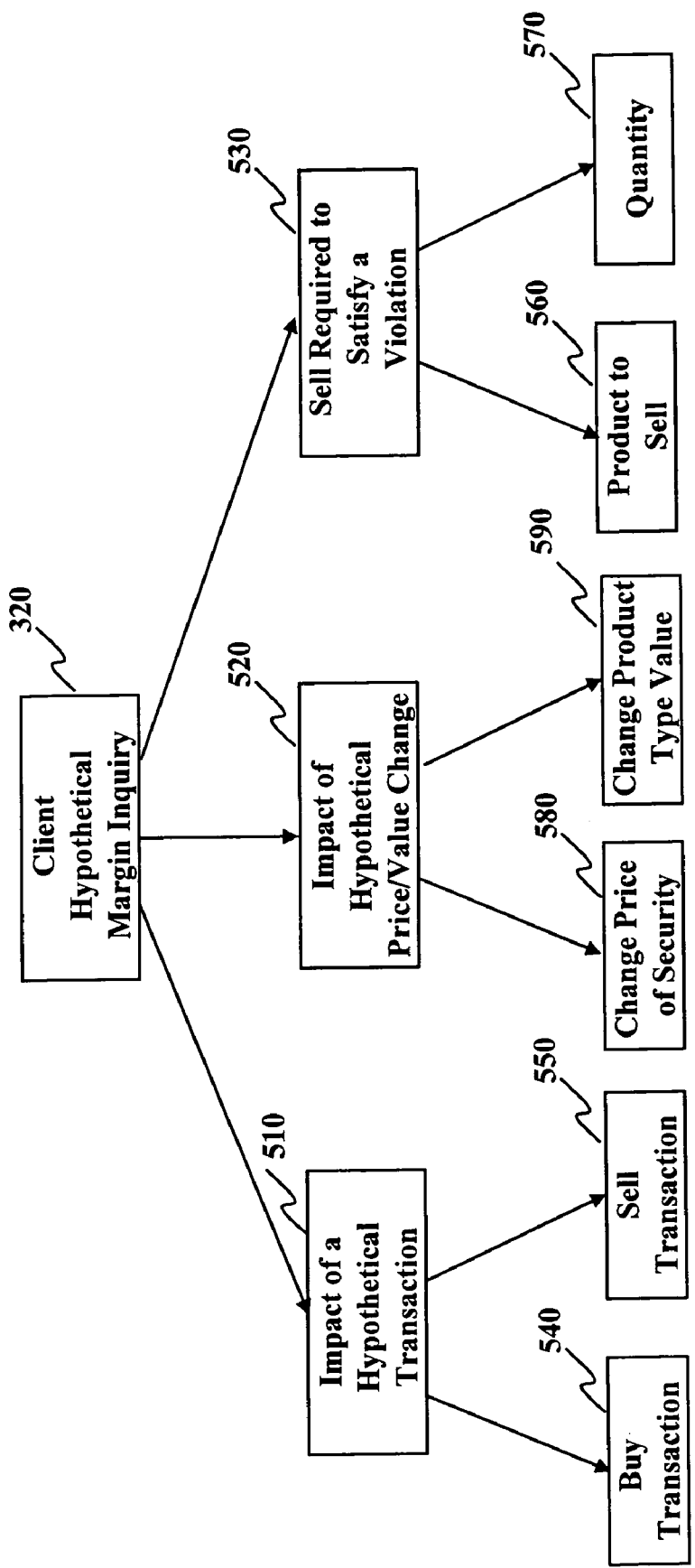
FIG. 5 illustrates exemplary types of client level hypothetical margin inquiry according to at least one embodiment.

FIG. 5 illustrates exemplary types of client level hypothetical margin inquiry according to at least one embodiment. A client hypothetical margin inquiry 320 may include an inquiry related to the impact of a hypothetical transaction 510, an inquiry related to the impact due to a hypothetical price or value change 520, or an inquiry in terms of how to satisfy a violation 530. When assessing the hypothetical impact of a transaction, the computations of margins are different depending on whether the proposed transaction is a buy transaction 540 or a sell transaction 550. When evaluating how to satisfy a violation, the inquiry may involve a proposed product to sell 560 at a certain price and a corresponding quantity to sell 570 in order to cure the underlying violation. When evaluating the impact of a hypothetical price or value change, the inquiry may involve changing the price of a security 580 or changing the product type value 590.

Figure 6:
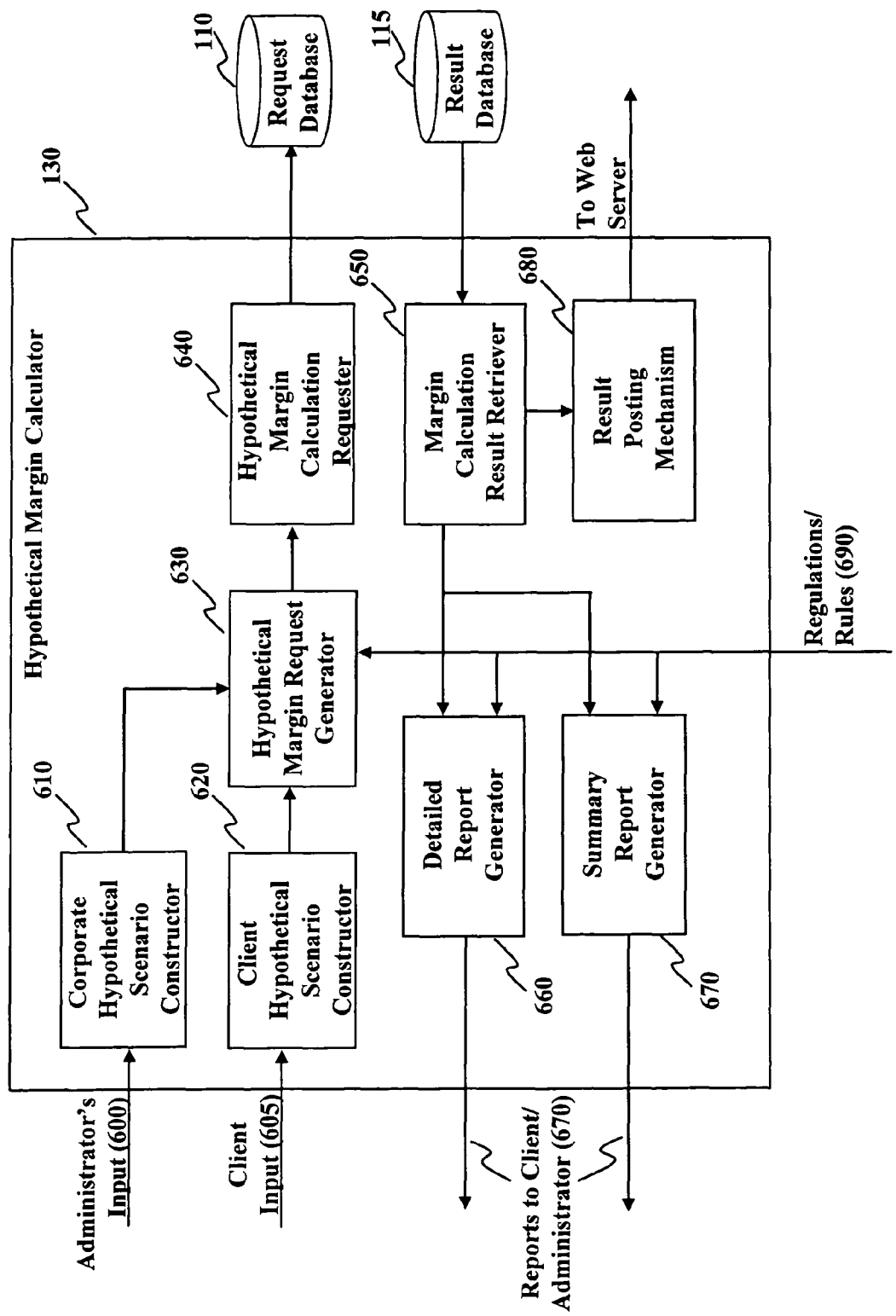
FIG. 6 depicts an exemplary internal functional block diagram of a hypothetical margin calculator, according to at least one embodiment.

FIG. 6 depicts an exemplary internal functional block diagram of the hypothetical margin calculator 130, according to at least one embodiment. In an embodiment, the hypothetical margin calculator 130 may comprise a corporate hypothetical scenario constructor 610, a client hypothetical scenario constructor 620, a hypothetical margin request generator 630, a hypothetical margin calculation requester 640, and a margin calculation result retriever 650. The corporate hypothetical scenario constructor 610 may construct a hypothetical scenario based on a business administrator's input 600. For example, a corporate level hypothetical scenario may include a change of the in-house requirement.

The client hypothetical scenario constructor 620 may construct a hypothetical scenario based on a client's input 605. For example, the client hypothetical scenario constructor 620 may gather all the detailed input related to a proposed transaction that may be entered by the user through, for instance, a web based graphical user interface. Detailed information related to a proposed transaction may include information related to the nature of the transaction (e.g., buy or sell), the price involved (e.g., at a specified price), and the quantity involved in the transaction (e.g., number of shares of a particular security to be sold).

Information related to a hypothetical scenario (either corporate level or client level) may then be forwarded to the hypothetical margin request generator 630 so that a specific margin inquiry request may be generated. The request may be generated to account various regulations and rules 690 to which a margin investment may be subject. Such a generated margin inquiry request may then be further forwarded to the hypothetical margin calculation requester 640 which may be responsible for sending the margin inquiry request to an appropriate mechanism. For example, a margin inquiry request may be sent to the request database 110, which may be subsequently retrieved by the margin calculation mechanism 145, or directly to the margin calculation mechanism 145 (not shown).

When the requested margin computation for a hypothetical margin inquiry is completed, the hypothetical margin calculator 130 may then retrieve the result. Different embodiments may be employed to obtain the computed margin information. The margin calculation mechanism 145 may place the result in the result database 115 and the margin calculation result retriever may subsequently retrieve the result (e.g., using a request identification corresponding to the initial margin inquiry request). Alternatively, the margin calculation mechanism 145 may also send the result directly to the hypothetical margin calculator 130 (not shown).

The hypothetical margin calculator 130 may also optionally comprise a result posting mechanism 680 which may be responsible for outputting or posting the received margin result computed according to a given hypothetical scenario on a certain web based interface to the user who issues the inquiry request. In addition, the hypothetical margin calculator 130 may also optionally include a detailed report generator 660 and a summary report generator 670. The former may be responsible for creating a detailed report on margins computed based on a hypothetical scenario and the latter may be responsible for creating an alternative summary report on the same result. The activation of either of the report generators may depend on the specification of the user who issues the hypothetical margin inquiry.

Figure 7:
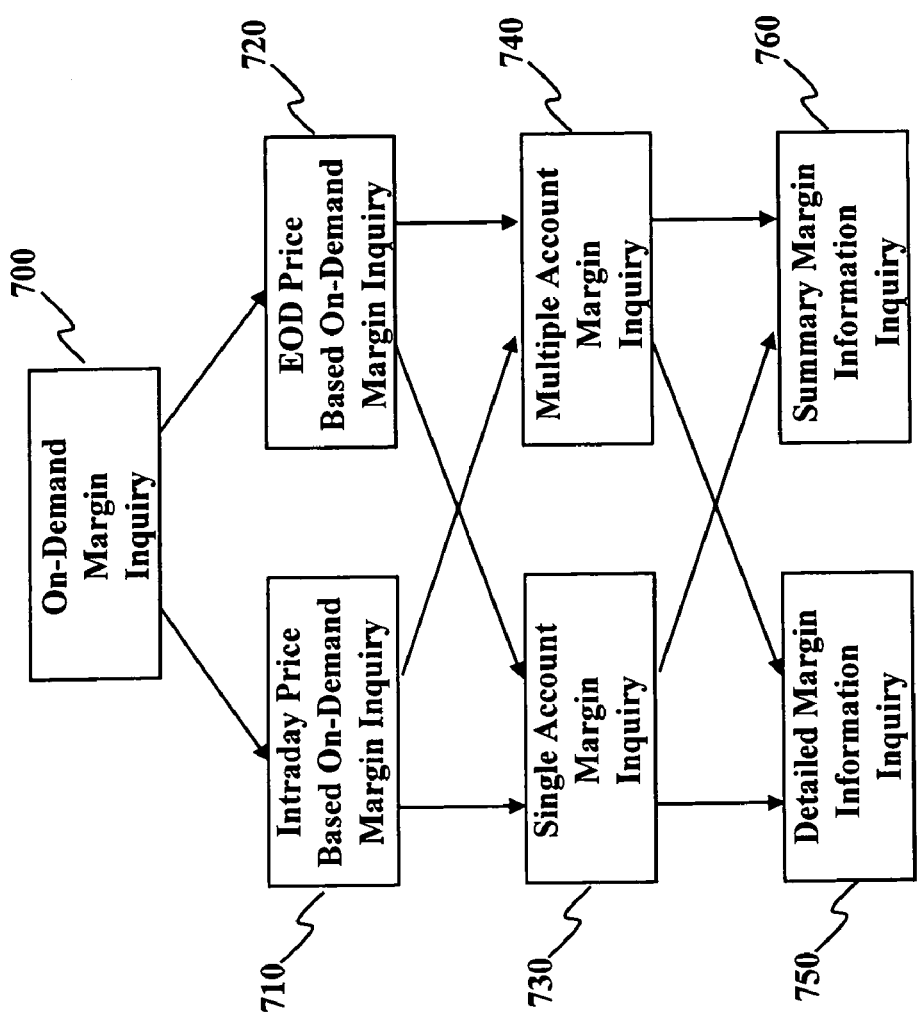
FIG. 7 illustrates exemplary types of on-demand margin inquiries according to at least one embodiment.

As mentioned earlier, another alternative real time margin inquiry may be associated with on-demand margin inquiry. FIG. 7 illustrates exemplary types of on-demand margin inquiries according to at least one embodiment. An on-demand margin inquiry 700 may be an inquiry that is made in real time according to demand. Margins inquired about may be computed using prices specifically indicated in the inquiry request. For example, an intraday price based on-demand margin inquiry 710 may include a direction to use intraday prices of involved securities in computing margins. An EOD price based on-demand margin inquiry 720 may include a direction to use the EOD prices of the previous day in computing margins. Margins may also be computed using an arbitrarily indicated price for each security (not shown). Each of such inquiries may be made against the portfolio of a single account 730 or a group of accounts 740. An on-demand inquiry may also be made as a detailed margin information inquiry 750 or as a summary margin information inquiry 760.

Figure 8:
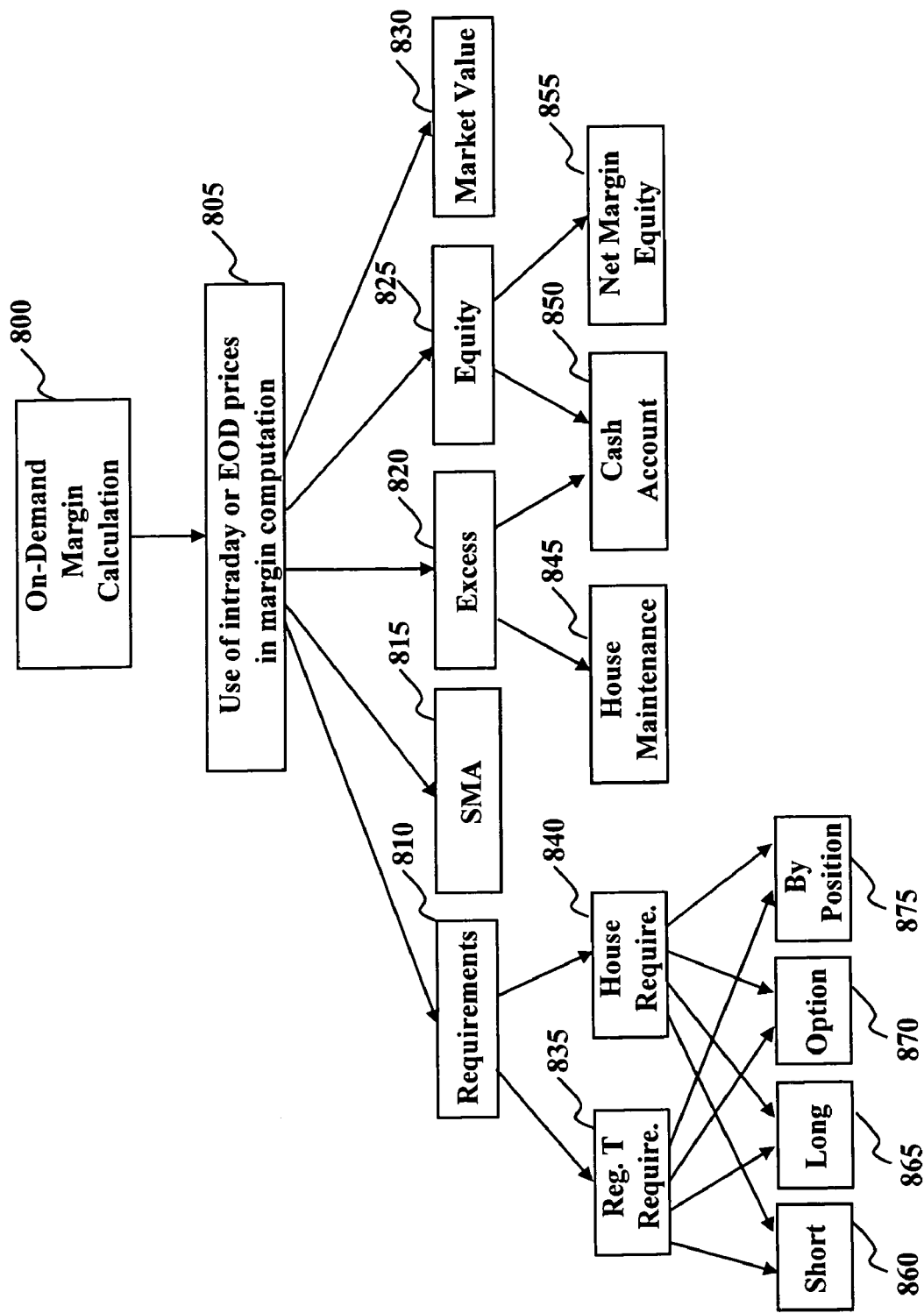
FIG. 8 illustrates exemplary types of margin related information computed in response to an on-demand margin inquiry according to at least one embodiment.

There may be alternative or multiple selections in terms of the types of information to be computed to respond to an on-demand margin inquiry. FIG. 8 illustrates exemplary types of margin related information computed in response to an on-demand margin inquiry according to at least one embodiment. To perform an on-demand margin calculation 800, specific security prices 805 may be determined before margins are computed. Based on specified prices, there may be different categories of information related to margins that are computed, including but not limited to, requirements 810, Special Memorandum Account (SMA) related information 815, excess related information 820, equity related information 825, and market value 830.

The requirements 810 may include requirements under different regulations or rules. For instance, some requirements may be determined by governmental regulations (e.g., regulation T requirement 835) or by local rules (e.g., in-house requirements 840). There may be further different kinds of requirements including short requirements 860, long requirements 865, option requirements 870, and requirements by position 875.

There may also be different types of excess related information. For example, this may include excess in terms of house maintenance 845 and excess in terms of cash account 850. Similarly, equity may be computed in terms of cash account 850 or in terms of net margin equity 855.

Figure 9:
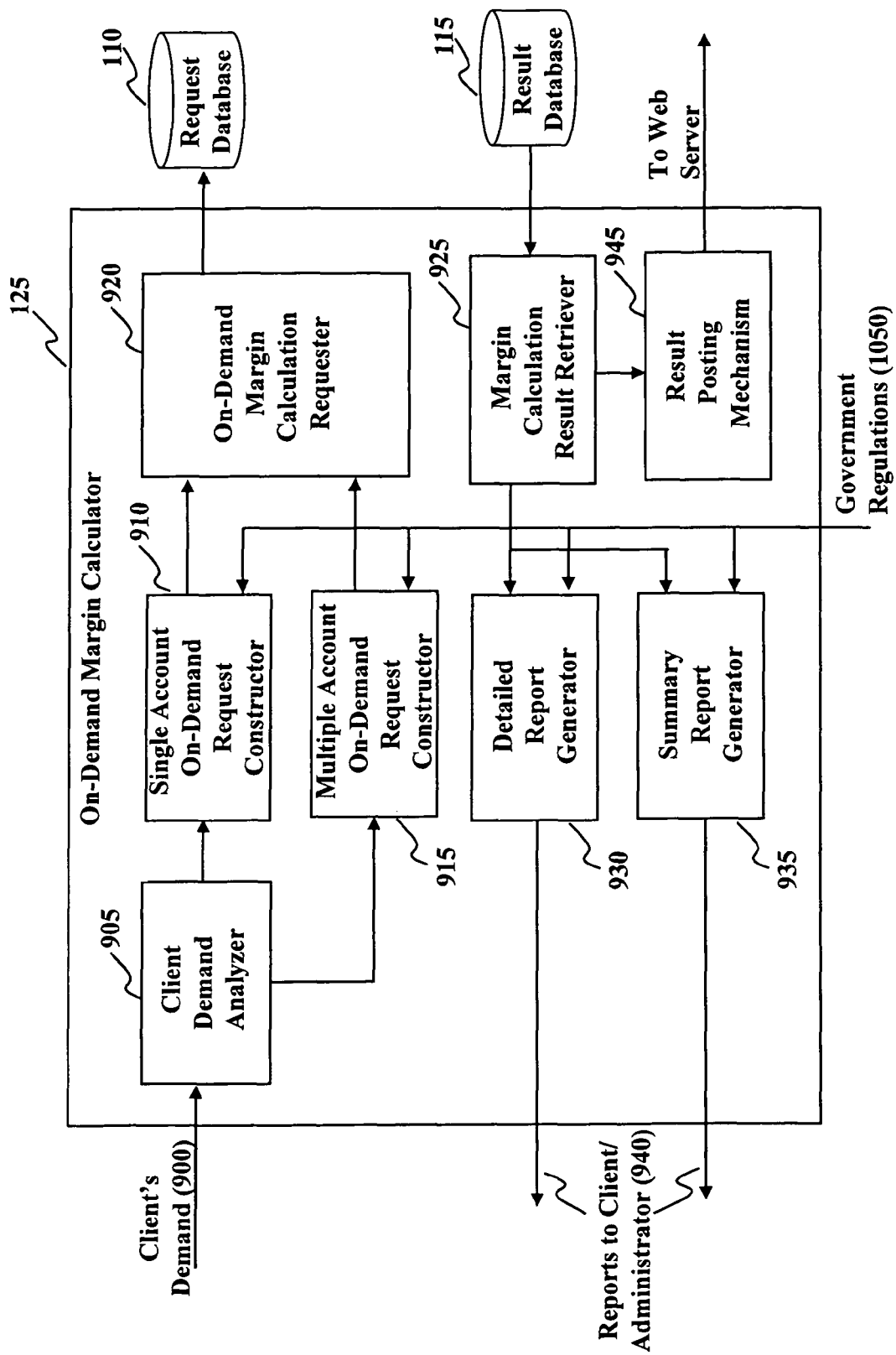
FIG. 9 depicts an exemplary internal functional block diagram of an on-demand margin calculator according to at least one embodiment.

FIG. 9 depicts an exemplary internal functional block diagram of the on-demand margin calculator 125 according to at least one embodiment. The on-demand margin calculator 125 comprises a client demand analyzer 905, a single account on-demand request constructor 910, a multiple account on-demand request constructor 915, an on-demand margin calculation requester 920, and a margin calculation result retriever 925.

The client demand analyzer 905 may perform analysis on a margin inquiry request received from the user 170. The analysis may distinguish different types of inquiry requests and associated inquiry parameters based on a client's demand 900. For instance, an on-demand inquiry may be initiated to request information about a single account or multiple accounts. Under each of such inquiries, there may be associated parameters such as whether to compute certain types of requirements. The single account on-demand request constructor 910 may construct an on-demand margin inquiry request against a single account. The multiple account on-demand request constructor 915 may similarly construct an on-demand margin inquiry request against a plurality of accounts.

An on-demand margin inquiry request (either constructed for a single account or for multiple accounts) is forwarded to the on-demand margin calculation requester 920 which may be responsible for sending the on-demand margin inquiry request to an appropriate mechanism. For example, a margin inquiry request may be sent to the request database 110, which may be subsequently retrieved by the margin calculation mechanism 145. Alternatively, the on-demand margin inquiry request may also be sent directly to the margin calculation mechanism 145 (not shown).

When the requested margin computation for an on-demand margin inquiry is completed, the on-demand margin calculator 125 may retrieve the result. Different embodiments may be employed to obtain the computed margin information. The margin calculation mechanism 145 may place the result in the result database 115 and the margin calculation result retriever 925 may subsequently retrieve the result (e.g., using a request identification corresponding to the initial margin inquiry request). Alternatively, the margin calculation mechanism 145 may also send the result directly to the on-demand margin calculator 125 (not shown).

The on-demand margin calculator 125 may also optionally comprise a result posting mechanism 945 which may be responsible for outputting or posting the received margin result computed according to a specific demand on, for example, certain web based interface to the user who issues the inquiry request. In addition, the on-demand margin calculator 125 may also optionally include a detailed report generator 930 and a summary report generator 935 that can generate reports that can be sent to a client or administrator 940. The former may be responsible for creating a detailed report on margins computed based on a demand and the latter may be responsible for creating an alternative summary report on the same result. The activation of either of the report generators may depend on the specification of the user who issues the on-demand margin inquiry.

Figure 10A:
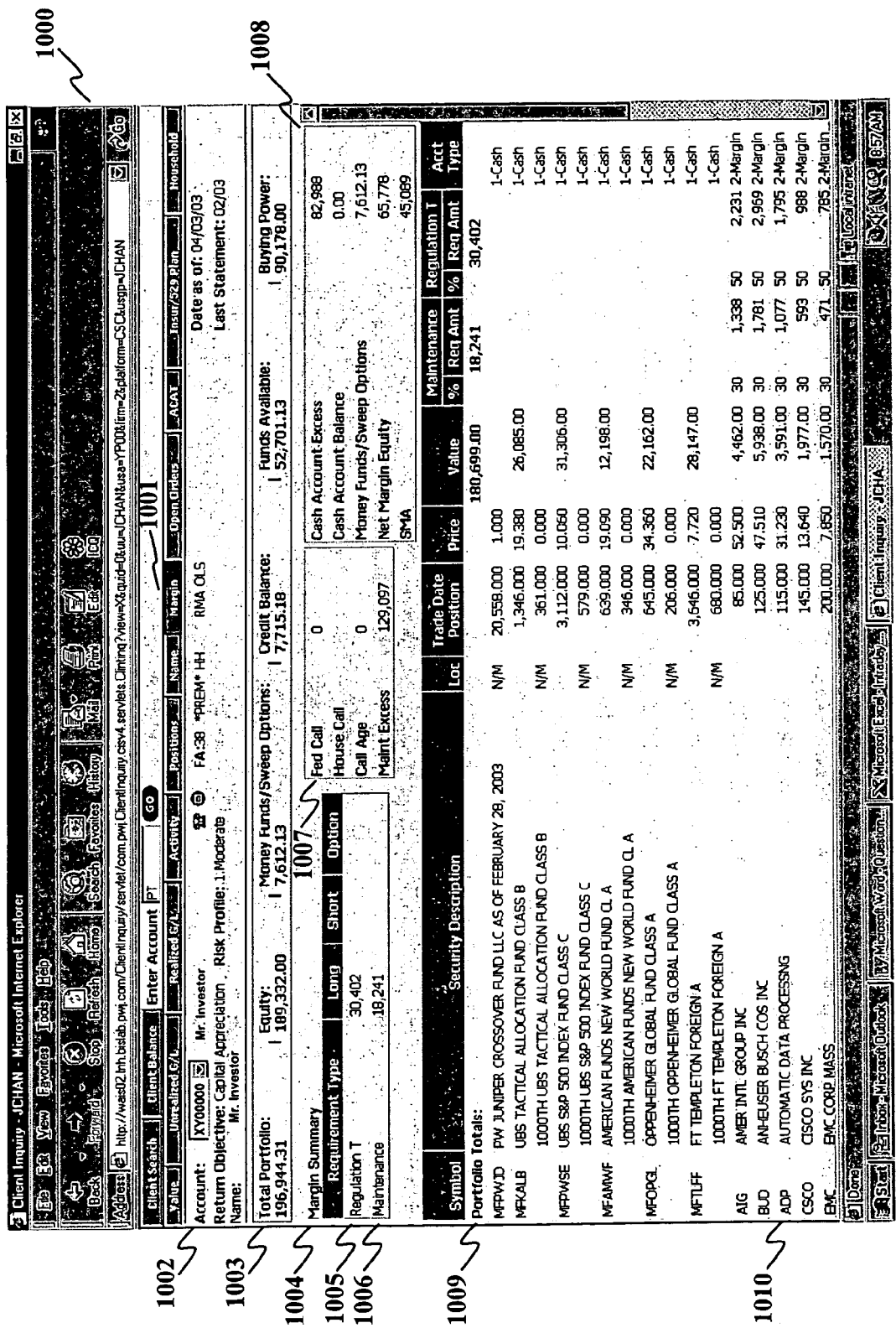
FIG. 10(a) is an exemplary client inquiry interface for account level on demand margin summary.

FIGS. 10($a$)-10($e$) are illustrative client inquiry interfaces for real time margin related inquiries according to at least one embodiment. FIG. 10($a$) is an exemplary client inquiry interface 1000 for an account level on demand margin summary. Account information 1002 may be entered to activate an inquiry. In this example, account number PT00201 is entered and it is used to load various information associated with the owner of the account such as the name (Dr. Mr. Investor) and financial agent's number 38. The general portfolio information 1003 of the account may be displayed. A margin summary may then be subsequently shown with different categories of requirements 1005 and maintenance 1006. Other summary information 1007 and 1008 may also be shown such as calls, excesses, call age, balances, and equities.

Individual securities and their associated positions may also be displayed in 1009. In such summary information, each security may be described in one row with various information associated with the security. For example, security 1010 has a symbol ADP with description "Automatic Data Processing" and it has a position of 115.00 shares with a price of $31.23, total value of 3,591.00, a maintenance percentage of 30 at 1,781 and a regulation requirement of 50 percent at 1,795. Such an inquiry interface provides both some detailed and some summary information associated with a single account.

Figure 10B:
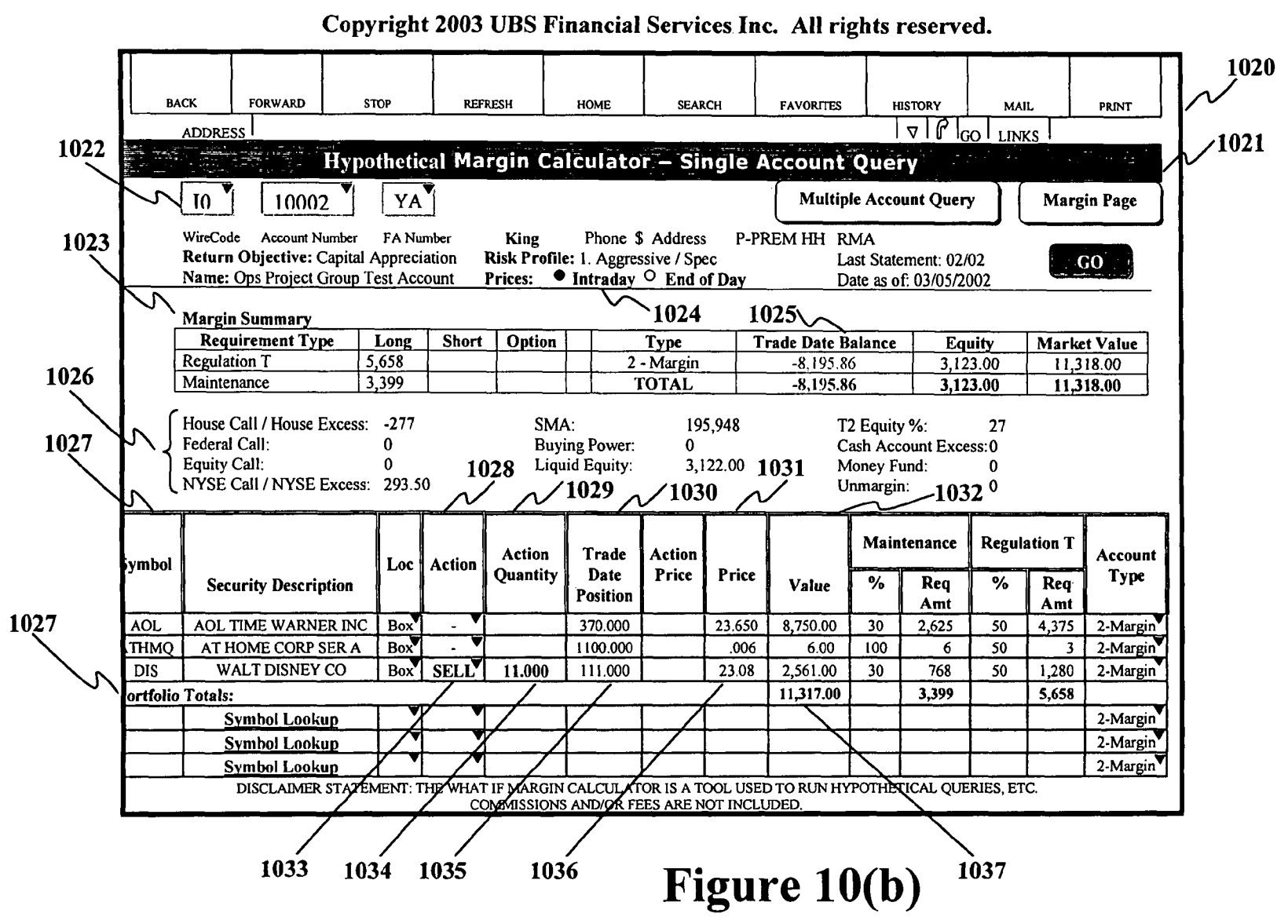

FIG. 10(b) is an illustrative query interface 1020 for a hypothetical margin inquiry 1021 for a single account according to an embodiment. User information 1022 may be entered and it may include wire code, account number, and financial agent's number. The user may also specify the prices used to perform the inquiry. For example, in FIG. 10(b), the intraday price 1024 is selected as source for the prices used in any hypothetical margin computation. Alternatively, end of day price may also be selected.

Based on selected prices, margins and related measures against the account are computed and displayed. A margin summary 1023 is provided with various requirements (e.g., long, short, option), balances, equities, and market values. In this example, the trade date balance 1025 for this account is −8,195.00. In addition, other summary information 1026 may also be displayed. Examples include various types of calls (e.g., house call, federal call, equity call, or NYSE calls), buying power, liquid equity, and cash account excess.

At the bottom part of the exemplary client inquiry interface 1020, a table 1027 may be used to not only display the status of each security according to the selected intraday prices but also specify hypothetical actions to be taken with respect to each security. For example, each row represents a security with its current trading position 1030, current price 1031, and current value 1032. For example, security AOL has a trading position of 370.00 with an intraday price of 23.65 at a value of 8,750.00. In addition, requirements according to both regulations and maintenance are also computed against each security within the account.

Through this interface, a user may also specify a proposed transaction on any of the securities in the portfolio. A proposed transaction may be specified in terms of an action 1028 (e.g., buy or sell), the action quantity 1029) (e.g., number of shares to be sold), and the price used 1031 in the proposed transaction (e.g., intraday price or market price). Such specified hypothetical actions may be part of a hypothetical scenario. For instance, for security DIS (for Walt Disney Co.), there is a specified "sell" action 1033 specified with an action quantity of 11 shares 1034. The proposed sell of DIS security is to be carried out against the current trading position of DIS 1035 (i.e., 111 shares) using the selected intraday price 1036 for DIS (i.e., 23.08 per share).

In row 1027 of FIG. 10(b), totals computed against all securities in the portfolio may also be displayed. For example, the total value computed across all securities 1037 is computed at 11,317.00. This corresponds to the total before the hypothetical transaction is performed.

FIG. 10(c) illustrates an interface 1040 for displaying the result 1041 of a single account hypothetical margin inquiry according to an embodiment. Specifically, the exemplary hypothetical inquiry result displayed in FIG. 10(c) is obtained by carrying out the hypothetical transaction (i.e., sell 11 shares of DIS security at intraday price or market price) specification described with reference to FIG. 10(b). The same account related information is displayed in 1042 and 1043 (intraday price). The result page may indicate that the hypothetical inquiry result is computed based on a proposed transaction 1043 to sell 11 shares of DIS 1044 at the market price. Notice that the market price is now 23.25 1044 (compared with 23.08 at the time the hypothetical transaction is specified as illustrated in FIG. 10(c)). There may be a button 1045 displayed next to the proposed transaction so that a user may simply click on the button to remove the proposed transaction.

The information displayed corresponds to the margin related information when the proposed hypothetical transaction is carried out. For instance, the information displayed in 1047 and 1048 differs from what is shown in section 1023, 1026, and 1027. The difference is due to the hypothetical sale. For example, the trade date balance in 1047 is −7940.11 compared with the corresponding trade date balance −8195.86 1025 in FIG. 10(b). In table 1046, the trading position for DIS security is now 100 1049 after 11 shares are hypothetically sold at a market price 23.25 1050. Due to the hypothetical sale, the total value computed across all securities is now 11,211.00 (compared with the corresponding total value of 11,317.00 in FIG. 10(b)).

Figure 10D:
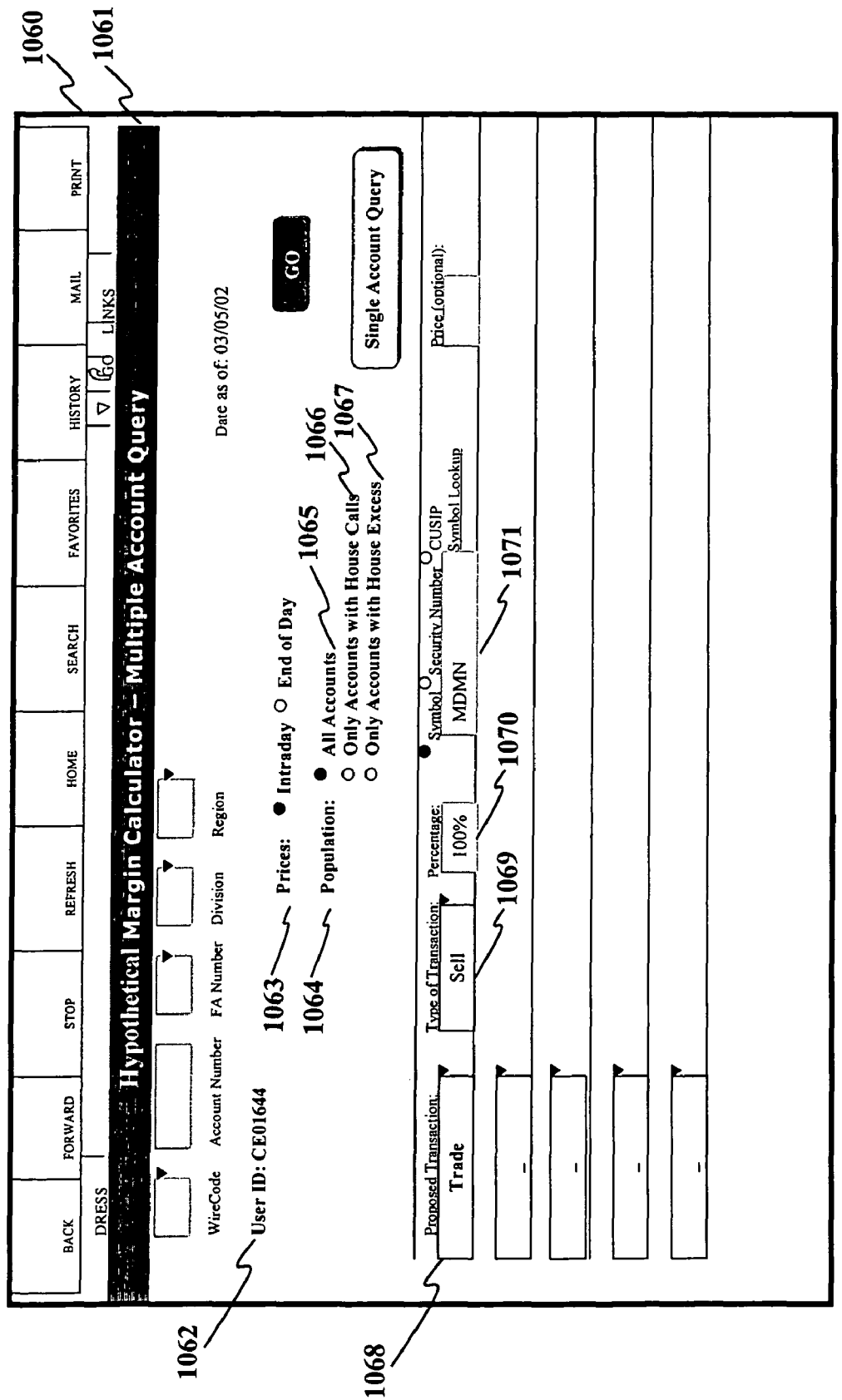
FIG. 10(d) is an illustrative client inquiry interface for multiple account hypothetical margin inquiry according to an embodiment.

FIG. 10(d) is an illustrative client inquiry interface 1060 for multiple account hypothetical margin inquiry 1061 according to an embodiment. A user may specify an identification 1062 which may correspond to the financial agent's number. Since a financial agent may represent a group of individual investors, the financial agent may make margin related inquiries against a group of accounts. For instance, in the interface illustrated in FIG. 10(d), an agent may select the intraday price 1063 for a hypothetical margin inquiry and specify the population 1064 across which the hypothetical inquiry is applied. For example, the agent may specify all of his accounts 1065. Alternatively, the agent may also specify a sub-population selected according to some criteria such as accounts with house calls 1066 or accounts with house excess 1067. The agent may then specify a hypothetical scenario. For instance, an agent may indicate a hypothetical trade transaction 1068 to sell 1069 all shares 1070 of security "MDMN" 1071 at intraday prices. This hypothetical transaction is specified as applied to all accounts under agent CEO 1644.

FIG. 10(e) is an illustrative interface 1080 that displays illustrates the hypothetical margin inquiry result 1081 produced after executing the proposed hypothetical transaction across all accounts under a financial agent with number CEO 1644. It is indicated that the transaction proposed 1082 is to sell all shares of MDMN at market price 1083. A list of summary results 1084 is displayed with each row for showing summary results for each account. The first column in the list 1084 corresponds to the account number (e.g., account number 1000028 1085), the second column corresponds to the name of the account owner, the third column represents the number of the financial advisor for the corresponding account 1087, and the rest of the columns provide computed margin related information after carrying out the hypothetical transaction. From such summary results on each account, the financial agent is able to assess the impact of the proposed hypothetical transaction.

Figure 11:
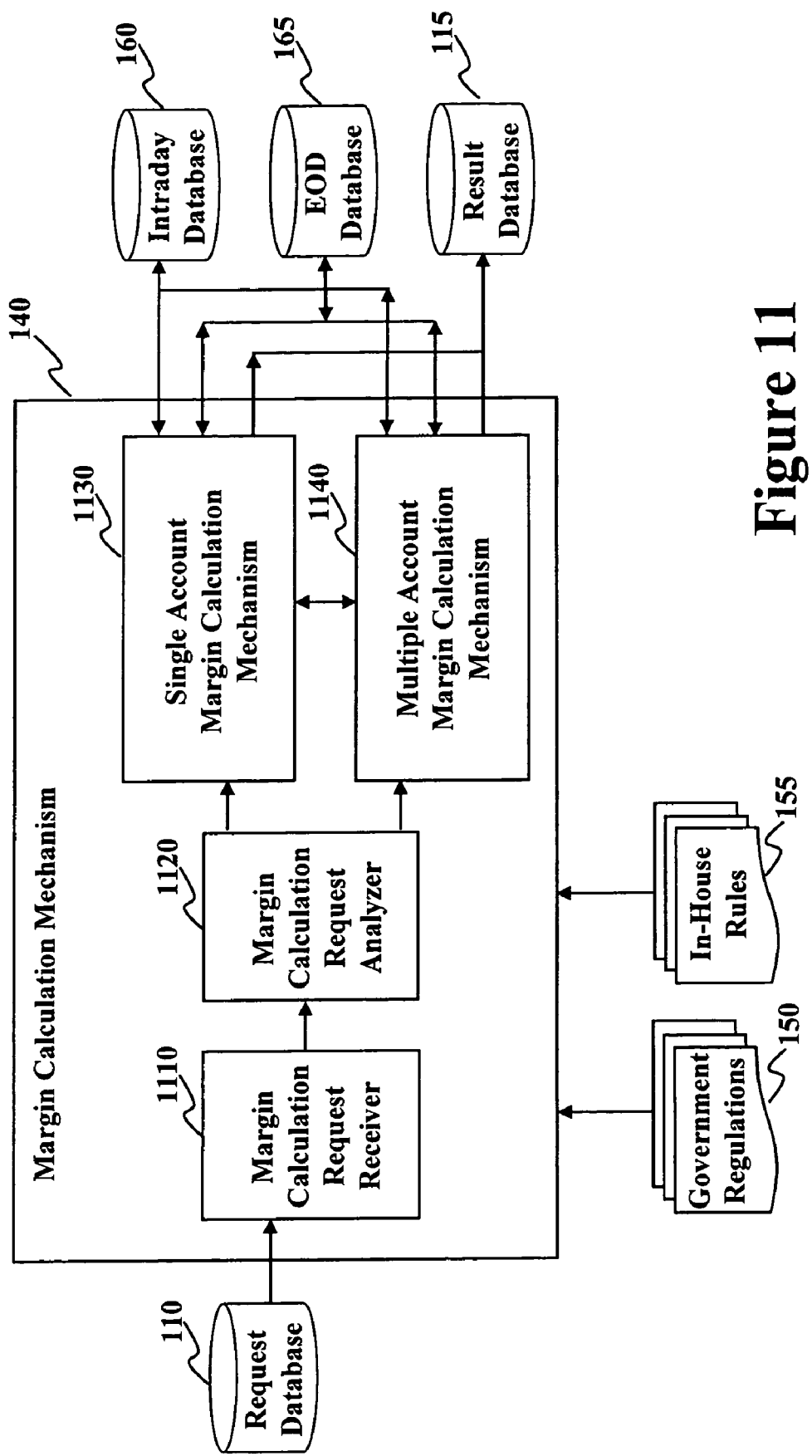
FIG. 11 depicts an exemplary internal functional block diagram of the margin calculation mechanism according to at least one embodiment.

FIG. 11 depicts an exemplary internal functional block diagram of the margin calculation mechanism 140 according to at least one embodiment. The margin calculation mechanism 140 may be designed to compute various margin related measures such as requirements, excesses, calls, balances, etc. The computation may be performed according to certain criteria such as governmental regulations 150 or in-house rules 155 applied and prices used. The margin calculation mechanism 140 may apply specific criteria in each computation according to an inquiry request, which may specify various computation criteria. Such an inquiry request may be received directly from an invoking mechanism (not shown) or retrieved from the request database 110.

After the margin computation, the margin calculation mechanism 140 may send the result directly back to the invoking mechanism (not shown) or may store the result in the result database 115 under some identification that may uniquely identify the inquiry. In one embodiment, the margin calculation mechanism 140 comprises a margin calculation request retriever 1110, a margin calculation request analyzer 1120, a single account margin calculation mechanism 1130, and a multiple account margin calculation mechanism 1140. The margin calculation request retriever 1110 may retrieve a margin inquiry request from the request database 110. Such a request may be stored there by an invoking mechanism with a unique identification number, which can be used to subsequently store the corresponding result for result storage and retrieval.

Each request may include various parameters specifying what needs to be computed and what criteria to be applied during the computation. Such information may be analyzed by the margin calculation request analyzer 1120, which may consequently generate appropriate signals to control the margin computations. Depending on whether the inquiry is a single account or multiple account inquiry, the margin calculation request analyzer 1120 may invoke the single account margin calculation mechanism 1130 to compute margins against a single account or invoke the multiple account margin calculation mechanism 1140 to compute margins across a group of accounts.

Figure 12:
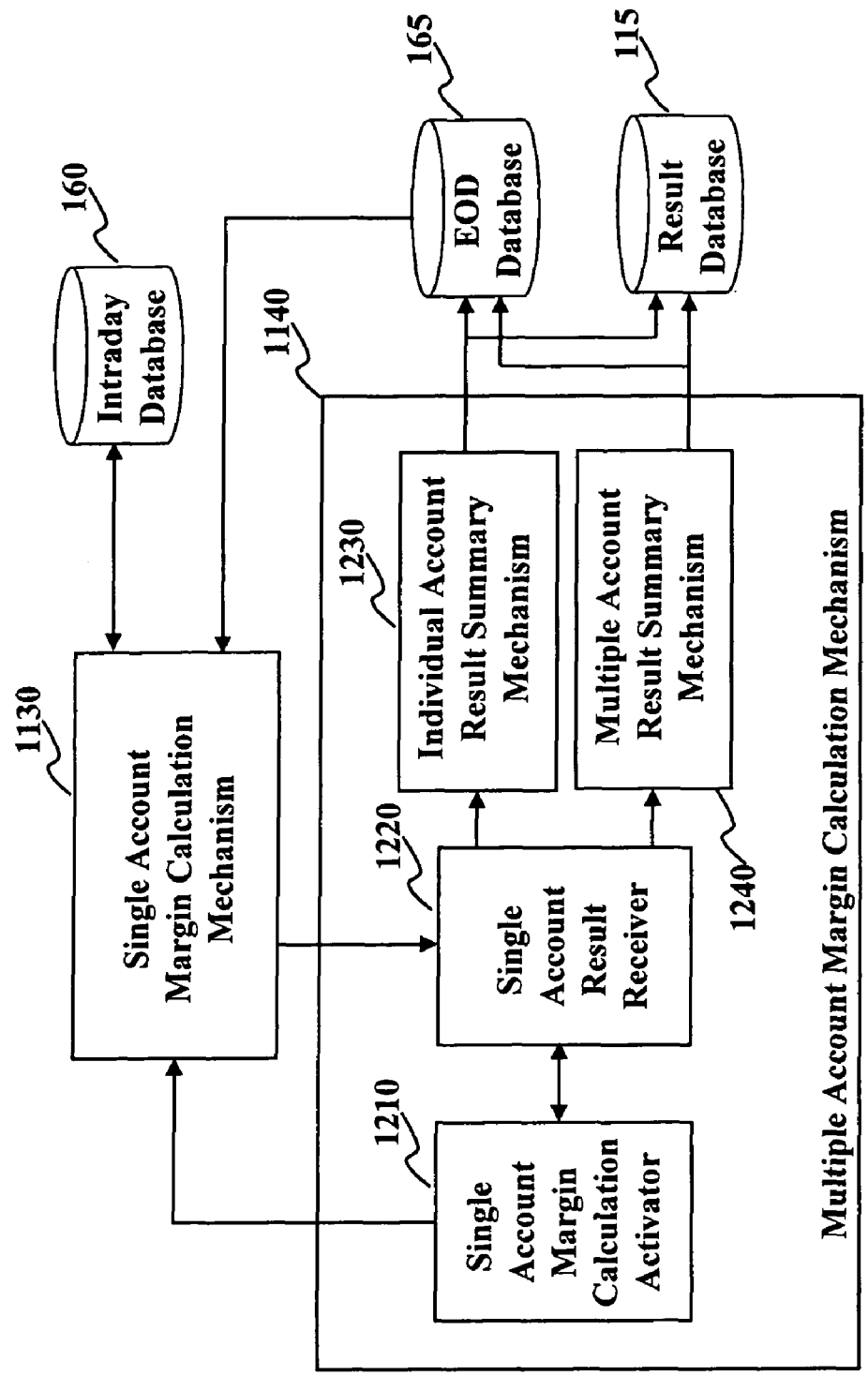
FIG. 12 depicts an exemplary internal functional block diagram of a multiple account margin calculation mechanism in relation to a single account margin calculation mechanism, according to at least one embodiment.

The multiple account margin calculation mechanism 1140 may interact with the single account margin calculation mechanism 1130 to compute margins for each of the multiple accounts for which margins are to be computed. One exemplary implementation of the multiple account margin calculation mechanism 1140 in relation to the single account margin calculation mechanism 1130 is illustrated in FIG. 12, according to one embodiment. To utilize the single account margin calculation mechanism 1130, the multiple account margin calculation mechanism 1140 may include a single account margin calculation activator 1210 and a single account result receiver 1220. The former may be responsible for invoking the single account margin calculation mechanism 1130 whenever it is appropriate. The single account result receiver 1220 may receive computed margin results for a single account whenever they are computed and activate the single account margin calculation activator 1210 to proceed to the next account.

When the single account result receiver 1220 receives computed margin results for a single account, it may forward such results to an individual account result summary mechanism 1230 and a multiple account result summary mechanism 1240. Such forwarded result may be summarized, organized according to some format required by the display or by the user who requests the margin computation. The result summary and organization may be performed in an incremental fashion. Whenever results for another account are received, it may be incorporated into the results that are already organized and summarized. When the computation of margins for all the accounts is completed, the organized results may be stored in the result database 115 under a unique identification under which the margin inquiry request is received.

Figure 13:
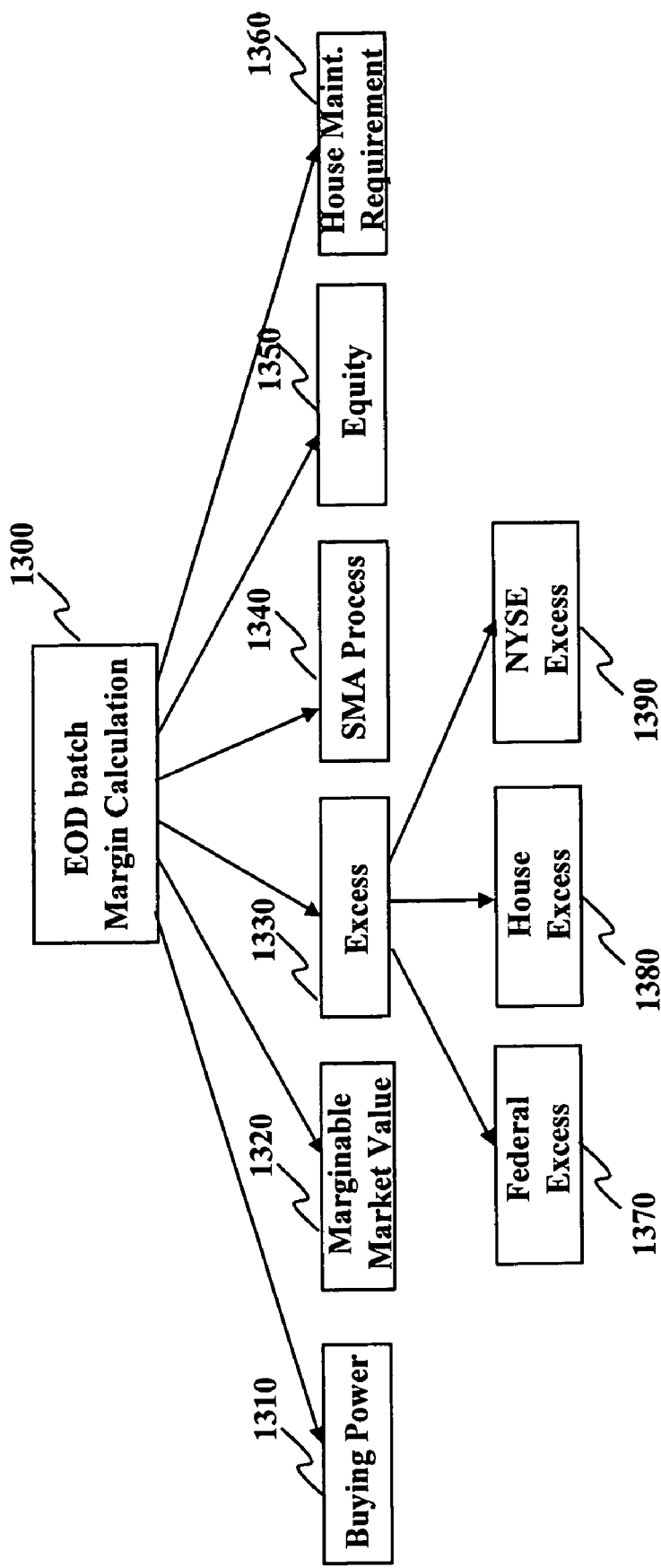
FIG. 13 illustrates exemplary types of end of day margin computations, according to an embodiment.

The margin calculation mechanism 140 may be invoked by either the real time margin management processor 120 or the end of day margin calculator 145. When the margin calculation mechanism 140 is invoked to perform end of day processing in a batch mode, margins computed may differ from what is required to be computed for real time margin related inquiries. FIG. 13 illustrates exemplary types of end of day margin computations, according to an embodiment.

End of day batch margin calculations 1300 may include the computation of buying power 1310, marginable market value 1320, excess under different criteria 1330, SMA process 1340, equity 1350, and house maintenance requirements 1360. The criteria under which excess may be computed may include federal excess according to federal regulations 1370, house excess according to in-house rules 1380, and NYSE excess according to NYSE regulations 1390. When the margin calculation mechanism 140 is invoked to perform margin computation in batch mode, the computed results may be stored into the EOD database 165 as shown in both FIGS. 11 and 12.

Figure 14:
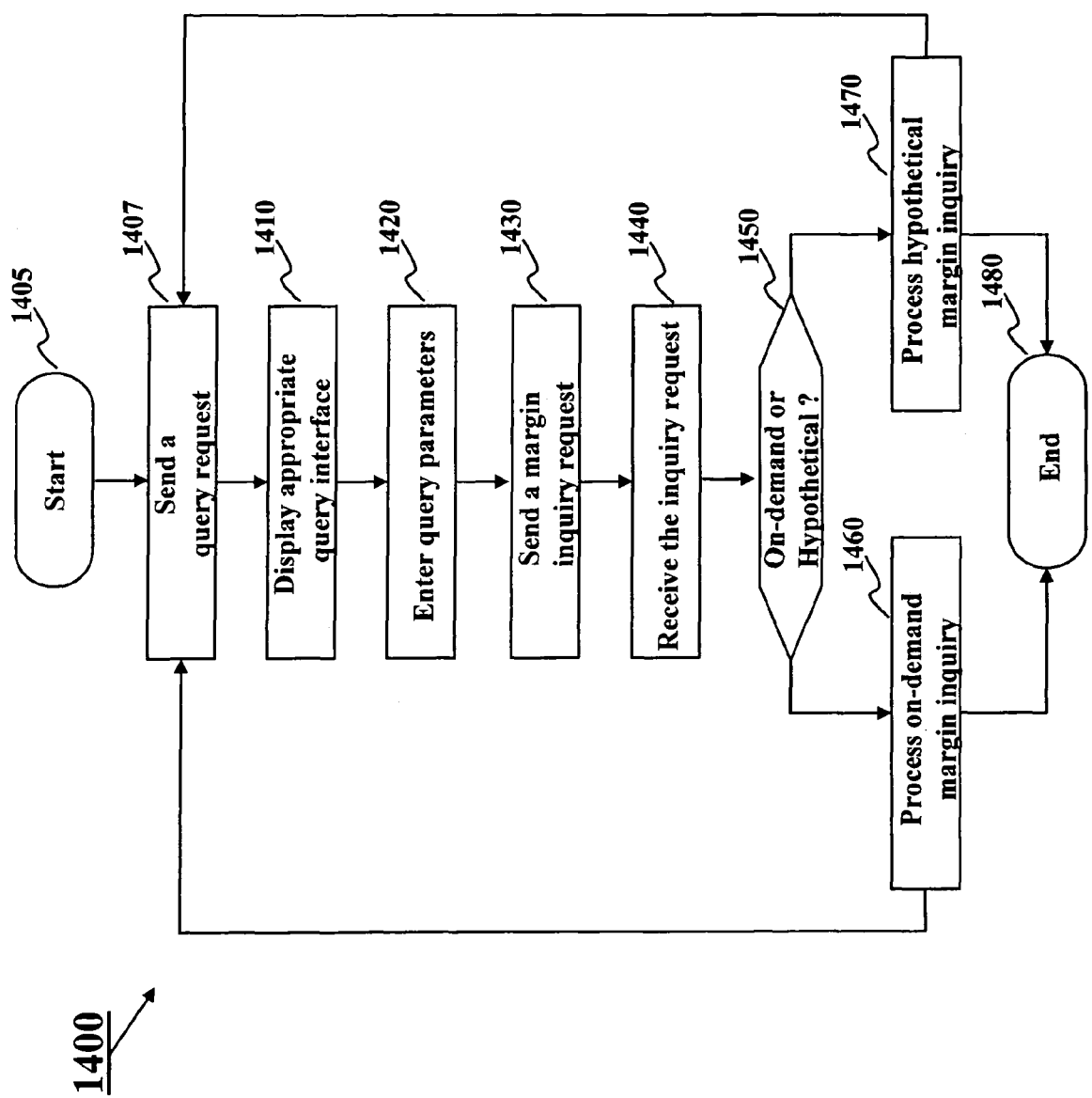
FIG. 14 is a flowchart of an exemplary process, in which a margin management mechanism provides a user the means to manage margins in real time according to at least one embodiment.

FIG. 14 is a flowchart of an exemplary process 1400, in which a margin management mechanism provides a user the means to manage margins in real time according to at least one embodiment. The process 1400 may commence at 1405, whereupon a user may send a margin query request at 1407. When the margin management mechanism receives the request, its margin inquiry interface may display appropriate interfaces, at 1410, to facilitate further interaction with the user. With the displayed appropriate interfaces, the user may enter, at 1420, query parameters such as the type of inquiry or hypothetical scenarios.

With specified query parameters, the margin inquiry interface may then construct accordingly a margin inquiry request and send such a request, at 1430, to a real time margin management processor. When the real time management processor receives the margin inquiry request at 1440, it may then determine, at 1450, whether the request is an on-demand margin inquiry or a hypothetical margin inquiry. If the request is for an on-demand margin inquiry, an on-demand margin calculator may be invoked at 1460 to process the on-demand margin inquiry. Further details related to the processing of an on-demand margin inquiry are discussed with reference to FIGS. 15 and 16. If the request is for a hypothetical margin inquiry, a hypothetical margin calculator may be invoked at 1470 to process the hypothetical margin inquiry. Further details related to the processing of a hypothetical margin inquiry are discussed with reference to FIGS. 17-19. After the inquiry request is processed, the process 1400 may end at 1480 or returns to 1407.

Figure 15:
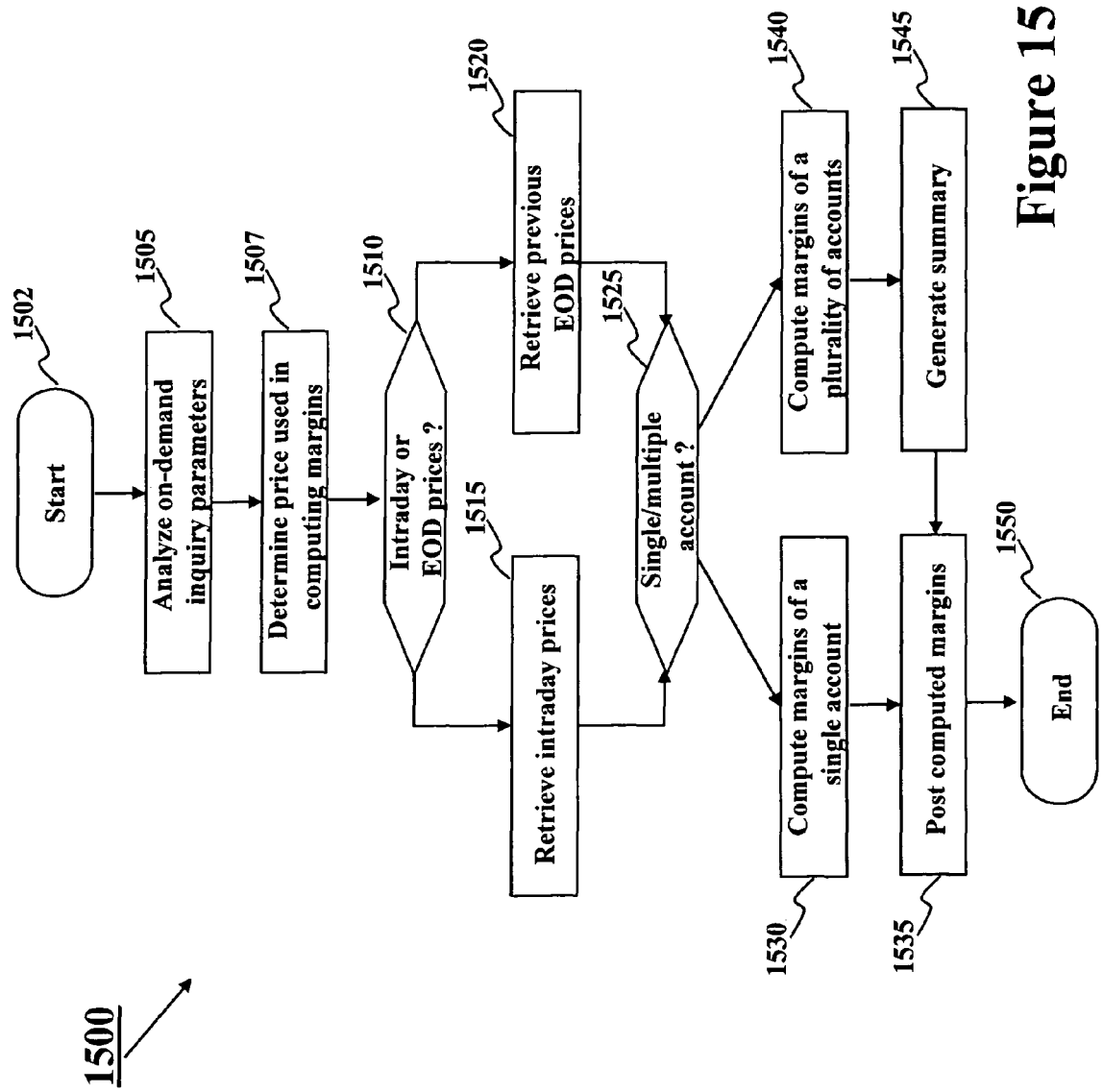
FIG. 15 is a flowchart of an exemplary process, in which an on-demand margin inquiry is processed according to at least one embodiment.

FIG. 15 is a flowchart of an exemplary process 1500, in which an on-demand margin inquiry is processed according to at least one embodiment. The process 1500 may commence at 1502, whereupon an on-demand margin inquiry request is first processed at 1505 to analyze relevant on-demand margin inquiry parameters. As discussed earlier, such parameters may include whether the inquiry is directed at a single account or a group of accounts, or what prices are to be used in computing margins.

To proceed with margin computation according to the demand, an on-demand margin calculator may further determine, at 1507, the specified prices used to compute the margins. There may be different alternatives such as intraday price or end of day price, as determined at 1510. If the user specifies to use the intraday (market) price, intraday prices related to corresponding securities are retrieved at 1515 from a intraday database. If the user specifies to use end of day prices, EOD prices of the corresponding securities are retrieved, at 1520, from the EOD database. Such retrieved EOD prices may correspond to the prices as of the end of the previous day.

The on-demand margin calculator may then determine, at 1525, whether the on-demand margin inquiry is directed at a single account or a plurality of accounts. If the inquiry is for a single account, the on-demand margin calculator may invoke a margin calculation mechanism to compute, at 1530, margins for a specified single account. The computed margins and relevant information (e.g., requirements, violation, calls, market value) may be outputted or posted to the requesting user at 1535.

If the on-demand inquiry is for a plurality of accounts (e.g., all the accounts under one financial agent), the on-demand margin calculator may invoke a margin calculation mechanism to compute, at 1540, margins and relevant information for all the specified accounts. Results produced to respond to an on-demand multiple account margin inquiry may then used, at 1545, to generate summaries or reports before such results are posted or output to the requesting user at 1535. The process 1500 may end at 1550.

Figure 16:
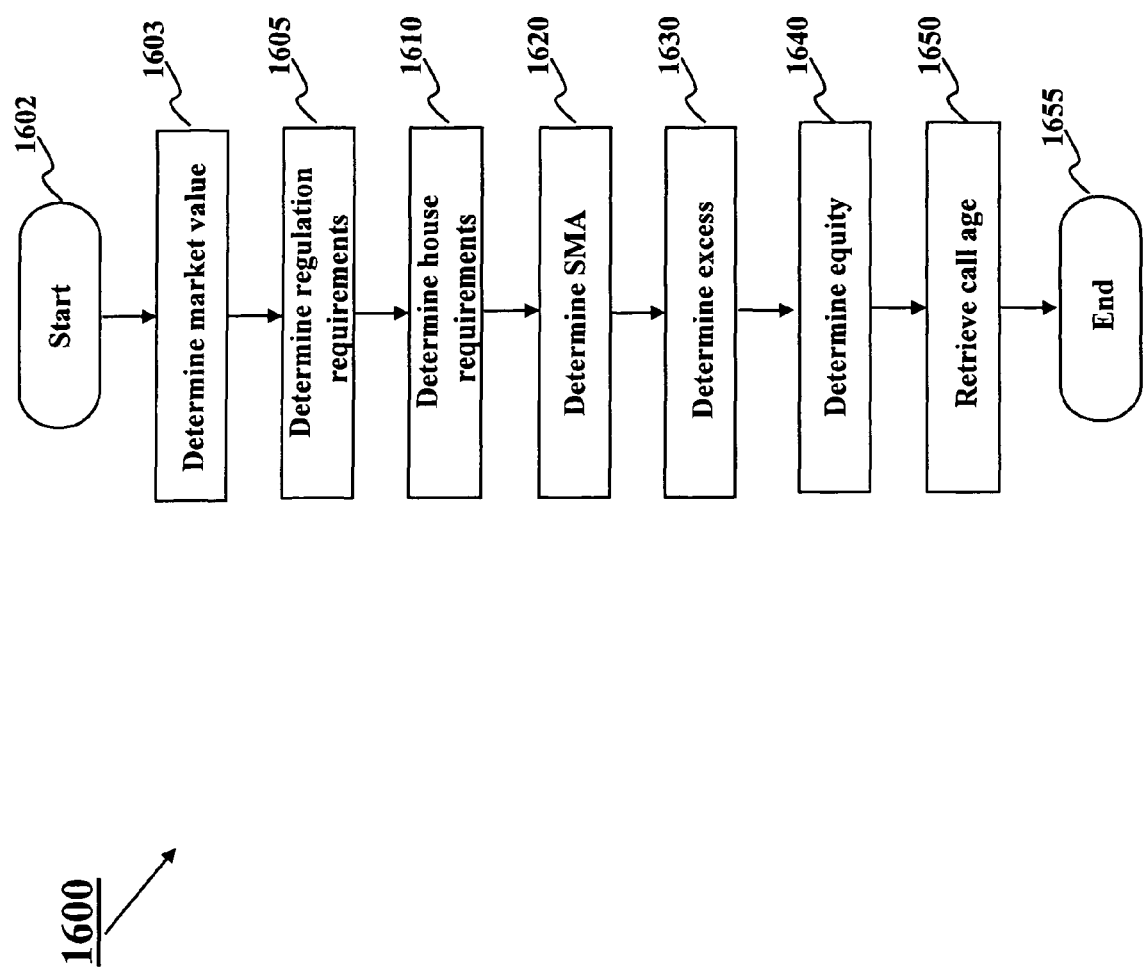
FIG. 16 is a flowchart of an exemplary process, in which a margin calculation mechanism determines various exemplary on-demand margins for a single account, according to at least one embodiment.

FIG. 16 is a flowchart of an exemplary process 1600, in which a margin calculation mechanism determines various exemplary on-demand margins for a single account, according to at least one embodiment. The process 1600 may commence at 1602, whereupon market value may be first determined at 1603 and regulations to be applied in computing certain requirements may be determined at 1605. In-house rules to be applied in computing different requirements may be determined at 1610. Such determined regulations and rules are then used in computing various margin related measures. Special memorandum accounts may be determined at 1620. The margin calculation mechanism may also determine excess, at 1630, under various conditions. Equity may also be determined at 1640 according to different criteria. Call age may be retrieved at 1650. At 1655, the process 1600 may end.

Figure 17:
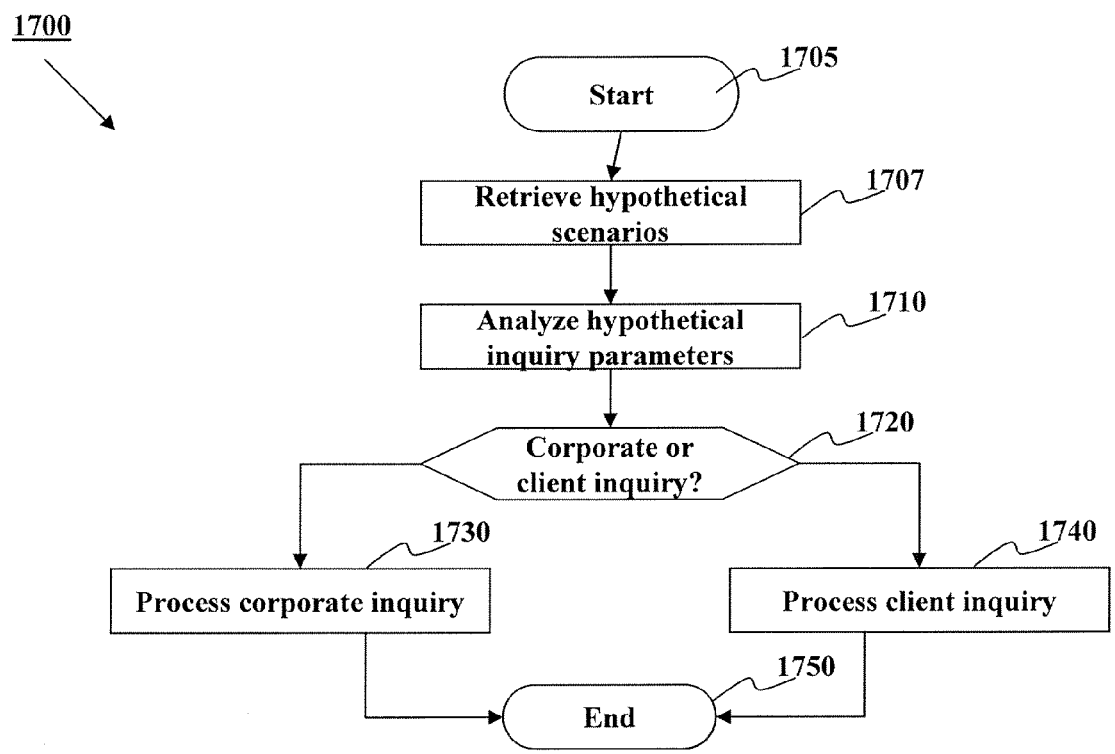
FIG. 17 is an overall flowchart of an exemplary process, in which a hypothetical margin inquiry is processed according to at least one embodiment.

FIG. 17 is an overall flowchart of an exemplary process 1700, in which a hypothetical margin inquiry is processed according to at least one embodiment. The process 1700 may commence at 1705. When a hypothetical margin inquiry request is received, the corresponding hypothetical scenario specified by a requesting user may be retrieved at 1707. Other relevant inquiry parameters may then be analyzed at 1710. If the inquiry is a corporate level hypothetical margin inquiry, determined at 1720, the received margin inquiry request is processed as a corporate inquiry at 1730. Further details related to corporate inquiry processing are discussed with reference to FIG. 18. If the hypothetical margin inquiry is a client level hypothetical margin inquiry, determined at 1720, the received margin inquiry request is processed as a client inquiry at 1740. Further details related to client level margin inquiry processing are discussed with reference to FIG. 19. The process 1700 may end at 1750.

Figure 18:
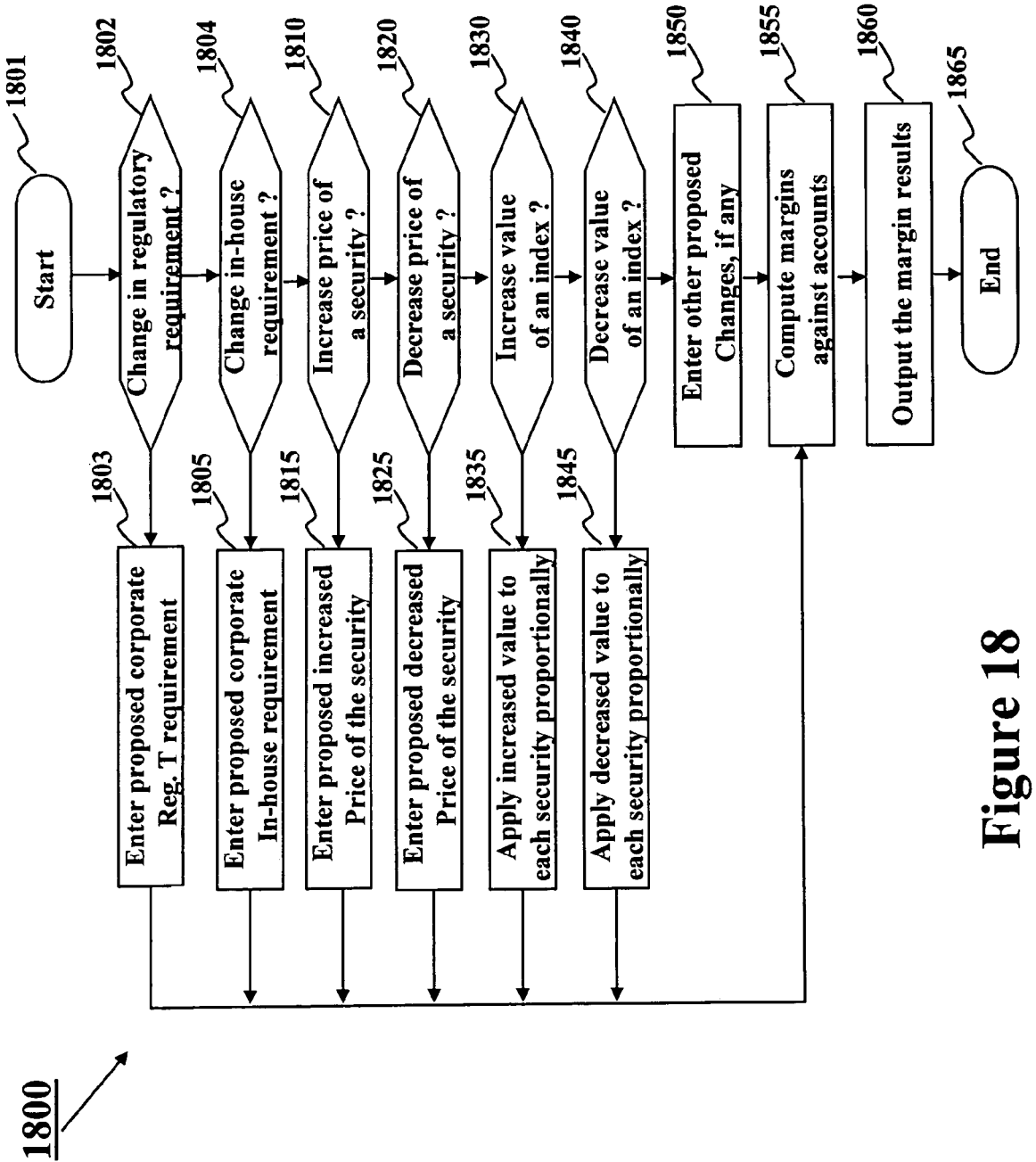
FIG. 18 is a flowchart of an exemplary process, in which a corporate level hypothetical margin inquiry is processed according to at least one embodiment.

FIG. 18 is a flowchart of an exemplary process 1800, in which a corporate level hypothetical margin inquiry is processed according to at least one embodiment. The process 1800 may commence at 1801. As discussed earlier, a corporate level margin related inquiry may be used to assess the impact related to a change in, for example, a specific policy or the value of a security or an index. To determine the impact related to a corporate level change, the kind of change is involved may be first determined. If the change is related to a regulatory requirement, determined at 1802, the proposed corporate regulation T requirement is entered first at 1803 and later used to compute, at 1855, margins and related measures against requested accounts. If the change is related to an in-house policy such as an in-house requirement, determined at 1804, the proposed new corporate level in-house requirement may be entered at 1805 and used to compute, at 1855, margins and related measures against individual or all accounts to assist the evaluation of the impact associated with the change.

If the change is related to a price increase of a specific security, determined at 1810, the proposed increase in price may be entered at 1815 and used to compute, at 1855, margins and related measures against all accounts to facilitate the evaluation of the impact. Similarly, if the change is related to a price decrease of a specific security, determined at 1820, the proposed decrease in price may be entered at 1825 and used to compute, at 1855, margins and related measures against individual or all accounts.

If the change is related to a value increase with respect to a particular index, determined at 1830, the proposed value increase may be specified and proportionally applied at 1835 to adjust the prices of all the securities that contain the index. Such adjusted prices may then be used to compute, at 1855, margins and related measures against individual or all accounts to evaluate the impact of the value increase. Similarly, if the change is related to a decrease in the value of a particular index, determined at 1840, the proposed value decrease may be proportionally applied, at 1845, to adjust the prices of the securities that contain the index. Those adjusted securities prices may then be used to compute, at 1855, margins and related measures against individual or all accounts.

Other alternative changes may also be specified, at 1850, and used to compute, at 1855, hypothetical margins to evaluate their impact. When the hypothetical margins are computed, they may be posted or output, at 1860, to assist the requesting user to review and to evaluate the impact. The process 1800 may then end at 1865.

Figure 19:
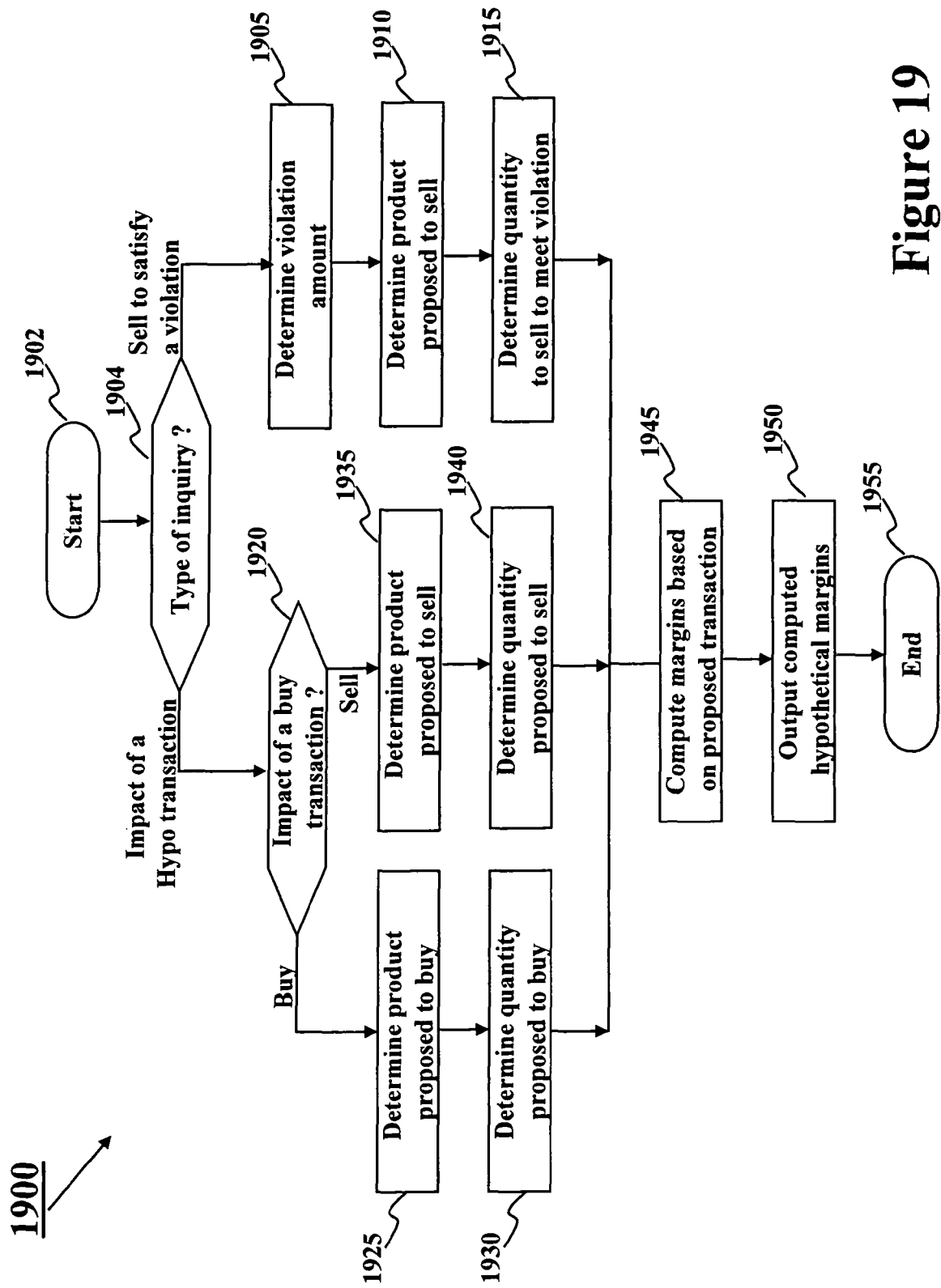
FIG. 19 is a flowchart of an exemplary process, in which a client level hypothetical margin inquiry is processed according to at least one embodiment.

FIG. 19 is a flowchart of an exemplary process 1900, in which a client level hypothetical margin inquiry is processed according to at least one embodiment. The process 1900 may commence at 1902, whereupon a specific type of hypothetical margin inquiry may be determined first at 1904. If it is a margin inquiry to assess the impact of a hypothetical transaction, it may be further determined, at 1920, whether the transaction is related to a sell or a buy transaction. If the hypothetical transaction is a buy transaction, the product or security proposed is determined at 1925 and the buy quantity is determined at 1930. Such determined transaction parameters represent a hypothetical transaction scenario and are applied to determine, at 1945, how margins and other relevant measures are affected by the hypothetical transaction. Such computed hypothetical margins are then posted or output, at 1950, to the requesting user.

If the proposed transaction is a sell transaction, the product to sell and its sale quantity are determined at 1935 and 1940. Such determined hypothetical scenario is then applied in determining, at 1945, the impact of the hypothetical transaction on margins and relevant measures. The computed hypothetical margins are then posted or output, at 1950, to the requesting user.

A hypothetical margin inquiry may also be related to an evaluation in terms of how to cure a violation associated with a particular account. A violation may be defined with respect to some requirement (e.g., federal regulation requirement or house requirement). For example, if a federal regulation requires that the equity in an account be at least 50% of the total market value of the account, if the equity is lower than the required percentage (e.g., 48%), a violation exists. A violation may be associated with a specific violation amount (e.g., 2% of the total market value). To determine how to cure a violation, the violation amount associated with an account may be first determined at 1905. With respect to the violation amount, a specific product or security may be proposed, at 1910, to be sold by a certain quantity, determined at 1915, to satisfy the underlying requirement. Such proposed transaction may then be hypothetically applied in computing, at 1945, the rest of the margins and related measures, which may then be posted, at 1950, to the requesting user. In addition, the client may hypothetically consider sending additional funds to fully or partially satisfy the violation amount (not shown).

The violation amount may be computed by taking this hypothetical payment into account which may subsequently affect the computation of a proposed transaction to cure the violation. The process 1900 may then end at 1955.

Figure 20:
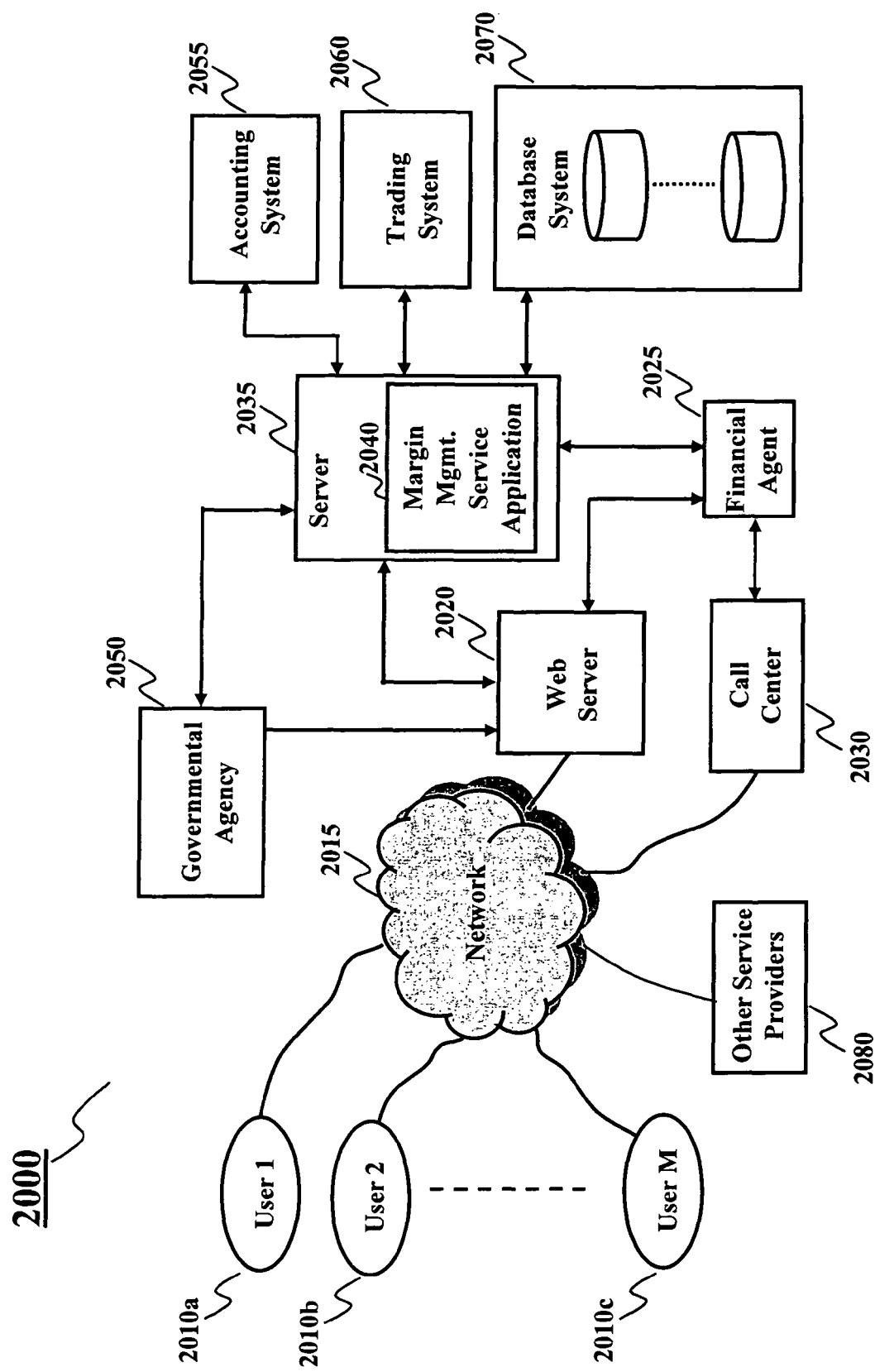
FIG. 20 depicts an exemplary framework in which a margin management service may be offered, according to at least one embodiment.

FIG. 20 depicts an exemplary framework 2000 in which a margin management service may be offered, according to at least one embodiment. In the framework 2000, the margin management service may be provided to a plurality of users (e.g., user 1 2010*a*, user 2 2010*b*, . . . , and user M 2010*c*) via a network 2015. The margin management service may be offered through a margin management service application 1240 running on a server 2035. The margin management service may be offered in accordance with one or more margin management methods that are consistent with what is described above. For instance, the margin management service may be based on the margin management mechanism 100 or individual components therein (e.g., the real time margin management 120 or the EOD margin calculator 145) or a combination thereof.

The network 2015 may represent a generic network, which may correspond to a Local Area Network (LAN), a Wide Area Network (WAN), the Internet, a proprietary network, a telephone network, a wireless network, or a conventional postal mail network. Depending on the nature of the network employed for a particular application, the network 2015 may be implemented accordingly. The network 2015 may serve the purpose of delivering information between connected parties.

A service provider that offers the margin management service 2040 may correspond to a bank, an investment institution, or other organization or company that provides financial services. The service provider may offer other services on the same or a different server as well in addition to the margin management service. For example, an investment institution may offer banking services in addition to its investment services. In the margin management methods described earlier, the margin management service 2040 may interface with different types of users such as individual investors, financial agents 2025 representing individual investors or corporate investors, corporate administrators who may adjust firm wide policies regarding margins, and system administrators who may debug the margin management service application when needed.

The margin management service application 2040 may include one or more modules or mechanisms including sequences of programmed instructions, which cooperate to perform client margin management operations. The programmed instructions, upon execution, are operable to configure a computer system (discussed with reference to FIG. 23) to carry out the client margin management operations described herein. These software instructions may be implemented using, for example, JavaScript® instructions. Other implementations are possible. For example, a portion of the margin management service application 2040 may be implemented using programmed instructions in accordance with the C++, Visual Basic™, or JavaScript® programming languages, or any combination thereof. The server 2035 may thereby be configured, using a sequence of programming instructions, for example, to perform margin management operations as described herein. The margin management service application 2040 may also include sequences of database access scripts to effect storage and retrieval of event data stored in a database. These database access scripts may, for example, be implemented in the form of SQL scripts.

The margin management service running on the server 2035 may be connected to different parties for different needs or purposes via different means. For example, the margin management service application 2040 may interact with its users through an online web site supported by a web server 2020 (for example, a Netscape™ web server) or through its representatives such as a financial agent 2045 who interacts with clients via telephone calls routed from a call center 2030. It is also possible for the call center 2030 to forward a margin management request that is automatically constructed based on a user's oral request made via a telephone connection and routed to the web server 2020.

The margin management service application 2040 may also interact with other service providers 2080. Those other service providers may provide some form of support or functions to the margin management service as part of a coherent service. For example, a service provider that offers the margin management service may outsource the billing function to an outside company or service provider. Such billing functions may include generating monthly statements with respect to margins of individual accounts and sending such statements to the contact addresses of the account holders.

The margin management service application 2040 may also interact with other related services from the same service provider. For example, since the margin management service application 2040 may facilitate margin management based on both actual or hypothetical investment decisions, the margin management service application 2040 may interface with a trading system 2060. The trading system 2060 may periodically invoke the margin management service application 2040 to perform, for instance, end of day processing to carry out registered trading transactions. Furthermore, the margin management service application 2040 may also interface with an accounting system 2055 to provide integrated services. The accounting system 2055 may perform accounting related functionalities such as computing the interest or gains associated with individual accounts. For example, for investment accounts, a gain may be computed daily according to the market. For a cash account, the gain may be computed as accrual of interest according to a dynamic interest rate associated with each individual account. Such computed gains may then be deposited back into the corresponding accounts or invested according to some pre-specified instructions.

There may be other combinations between the margin management service and other services. For instance, the margin management service may be integrated with a sweeping service, which provides automated means to sweep funds among different types of investment accounts (not shown). The margin management service may also be interfaced with conventional banking services to handle, for example, cash transactions (now shown).

The margin management service application 2040 may also perform some functions in compliance with laws or certain governmental regulations. The margin management service application 2040 may be in communication with some governmental agency (or agencies) 2050 to synchronize its service with dynamic governmental requirements. For example, federal regulations regarding the required percentage of equity in each margin account may change over time and need to be adaptively applied to all accounts. As another example, the service provider offering the margin management service may be required by regulation to report to the federal government on detailed transaction activities performed on the accounts that it serves.

Functionalities performed in compliance with governmental regulations may be performed, for example, via a proprietary interface between the margin management service application 2040 or a secure web interface supported by the web server 2020. Such functionalities may be implemented as web based application programs executed on one or more web application servers.

The margin management service may be distributed (not shown). Different offices or locations that support various aspects of the margin management service may manage their own local accounts on their local secure environment. The management at different locations may differ in terms of service policies. Although the management may be distributed, the margin management service application or service provider may have access to individual offices for management purposes through, for example, secure communication channels. Alternatively, there may be a centralized management of all distributed sites so that services supported at distributed sites may be controlled in a synchronous fashion.

A database system 2070 may be responsible for providing data storage and data access, including retrieval, update, and deletion. The margin management service application 2040 may communicate with the database system 2070 in a secure manner. Connections may be accomplished via different protocols such as TCP/IP. The margin management service application 2040 may communicate with the database system 1250 in accordance with Java Database Connectivity (JDBC) protocol. Alternatively, database connectivity may be accomplished using a ColdFusion™ server engine either via Open Database Connectivity (ODBC) or native connections.

The database system 2070 may be provided in conformance with a database management system format such as, but not limited to, the Structured Query Language (SQL) format. The database system 1250 may also be implemented using Sybase® database management system provided by Sybase® Corporation of Emeryville, Calif. and executing on, for example, an IBM® RS6000™ workstation AIX® version 4.2.1. Alternatively, the database system 2070 may also be implemented in accordance with the DB2 database product standard available from IBM® Corporation. Furthermore, the database system 2070 may be a SQL Server 7.0 database supporting the ActiveX Data Object (ADO) and ODBC protocols, provided by IBM® Corporation or Oracle® Corporation.

The database system 2070 may further include information such as, but not limited to, database query and access instructions in the form of one or more scripts which, when executed by a processor, serve to store, retrieve, or update data maintained in the database system 2070 according to instructions contained in the scripts, and in particular regarding the data fields to be accessed as well as their arrangement of the fields.

The database system 2070 may be distributed. This may be done particularly so that services are offered in a distributed manner with each office site maintaining its own local database system. In this case, there may be a centralized data management scheme in addition to individual data management systems and this central data management may regularly communicate with individual local management to ensure data consistency and integrity.

In at least one embodiment, databases used by the margin management service application to store data related to margin management (e.g., intraday database 160 or EOD database 165 according to the margin management mechanism 100) may reside in the database system 2070. Alternatively, such databases may also reside on the server 2035, which may interact with the database systems 2070 for data related to other integrated services.

Figure 21:
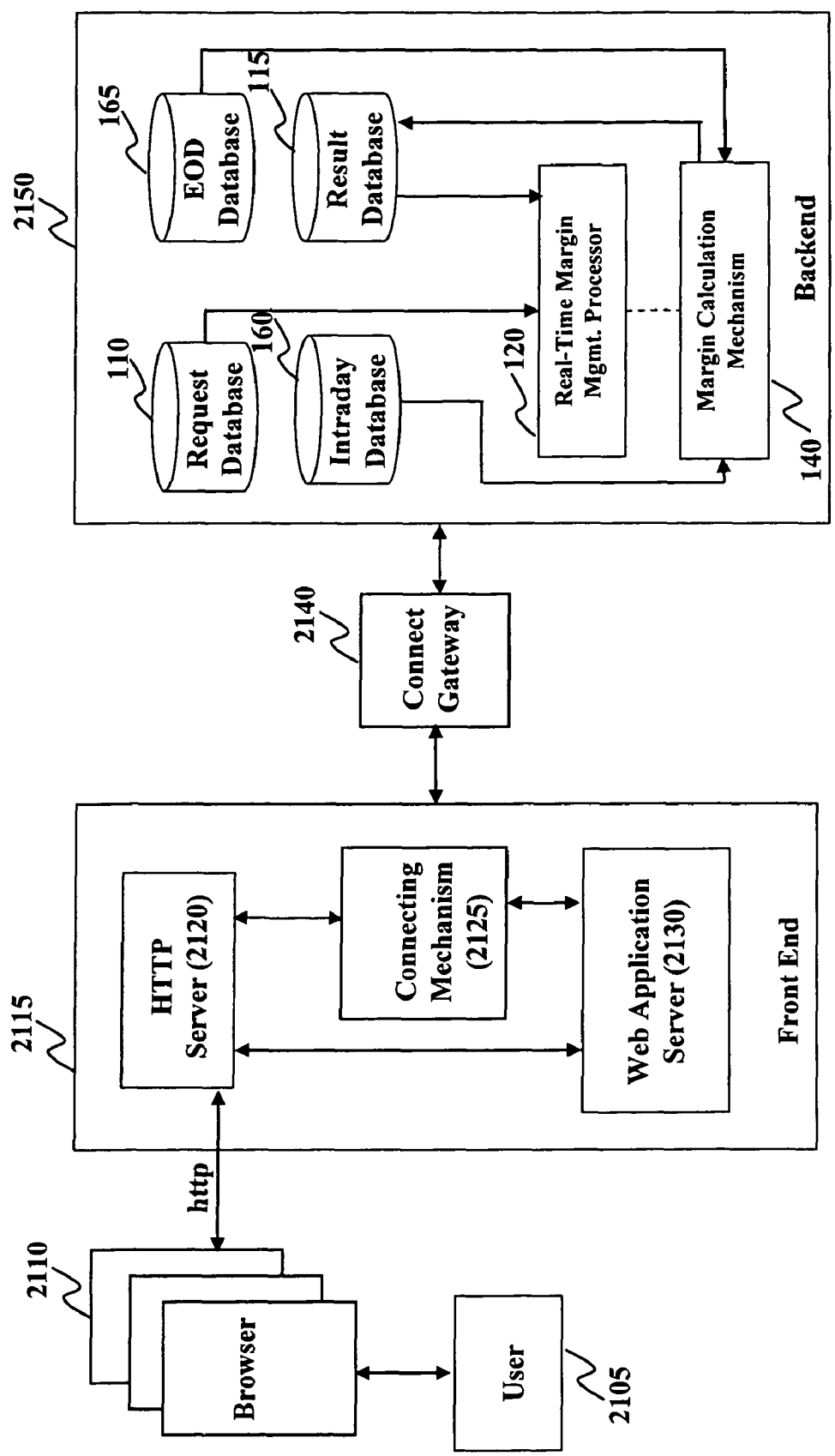
FIG. 21 shows an exemplary system configuration that supports a margin management service, according to one embodiment.

FIG. 21 shows an exemplary system configuration that supports the margin management service, according to an embodiment. A user 2105 may interact with the margin management service application via a browser 2110 through a front-end system 2115. The front-end system 2115 may be connected with a back end system 2150 via a connect gateway 2140.

The front-end system 2115 may comprise a HyperText Transfer Protocol (HTTP) server 2120, a web application server 2130, and a connecting mechanism 2125. The HTTP server 2120 may serve as the web server 2020, capable of being configured to generate and output interactive pages to a user station using the World Wide Web and suitable for display using a web browser. The web application server 2130 may serve as the server 2035. Such a web application server may correspond to a secure web application server behind the HTTP server 2120 (or web server 2020) employed to run one or more web based application programs (e.g., an application program to carry out the margin management methods described above) in a secure fashion.

The web application server 2130 may be configured to execute one or more web based application programs, responsive to commands and data received from the users via a web page supported by the HTTP server 2120 (or web server 2020), and providing data and results to the users. The HTTP server 2120 and the web application server 2130 may be implemented using a single computing platform. Alternatively, they may also be implemented using separate computing platforms.

The connecting mechanism 2125 may be responsible for connecting the front end system 2115 with the backend system 2150 through a connect gateway 2140. Such connection may be realized using certain communication protocols such as an Embedded Communication Interface (ECI). The backend system 2150 may comprise one or more components of the margin management mechanism 100 such as the real time margin management processor 120, the EOD margin calculator 145 (not shown), the violation detector 135 (not shown), . . . , and the margin calculation mechanism 140. The backend system 2150 may also optionally include various databases used for margin management purposes. This may include the request database 110, the result database 115, the intraday database 160, and the EOD database 165. Alternatively, some of those databases may also reside on the web application server 2130 in the front-end system 2115 such as the request database 110 or the result database 115. In addition, the intraday database 160 or the EOD database 165 may reside on either the web application server 2130 (i.e., the server 2035) or on the database system 2070.

Figure 22:
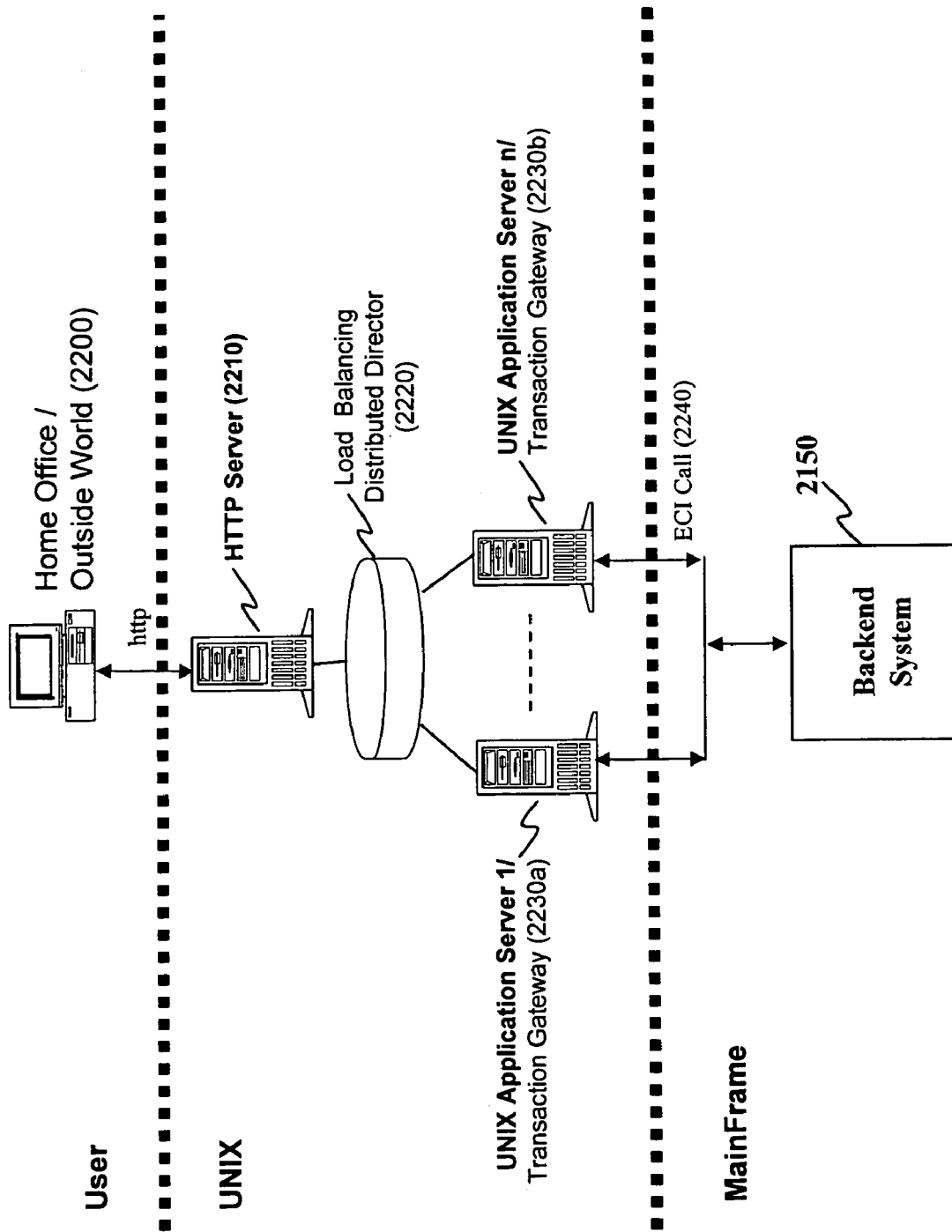
FIG. 22 shows an exemplary implementation of a system configuration that supports a margin management service, according to at least one embodiment.

FIG. 22 shows an exemplary implementation of the system configuration shown in FIG. 21. A user from a home office or outside world may interact through a user terminal 2200 with a UNIX HTTP server 2210 via HTTP protocol. The UNIX HTTP server 2210 communicates with one or more UNIX web application servers 2230a, . . . , 2230b). The communications between the UNIX HTTP server 2210 and the UNIX application servers may optionally communicate through a load balancing distributed director 2220 so that communication loads may be directed to different applications servers in a manner that substantially balances the load. The UNIX application servers may have transaction gateways that may be capable of sending ECI calls 2240 to the mainframe backend system 2150 to request various computations.

Figure 23:
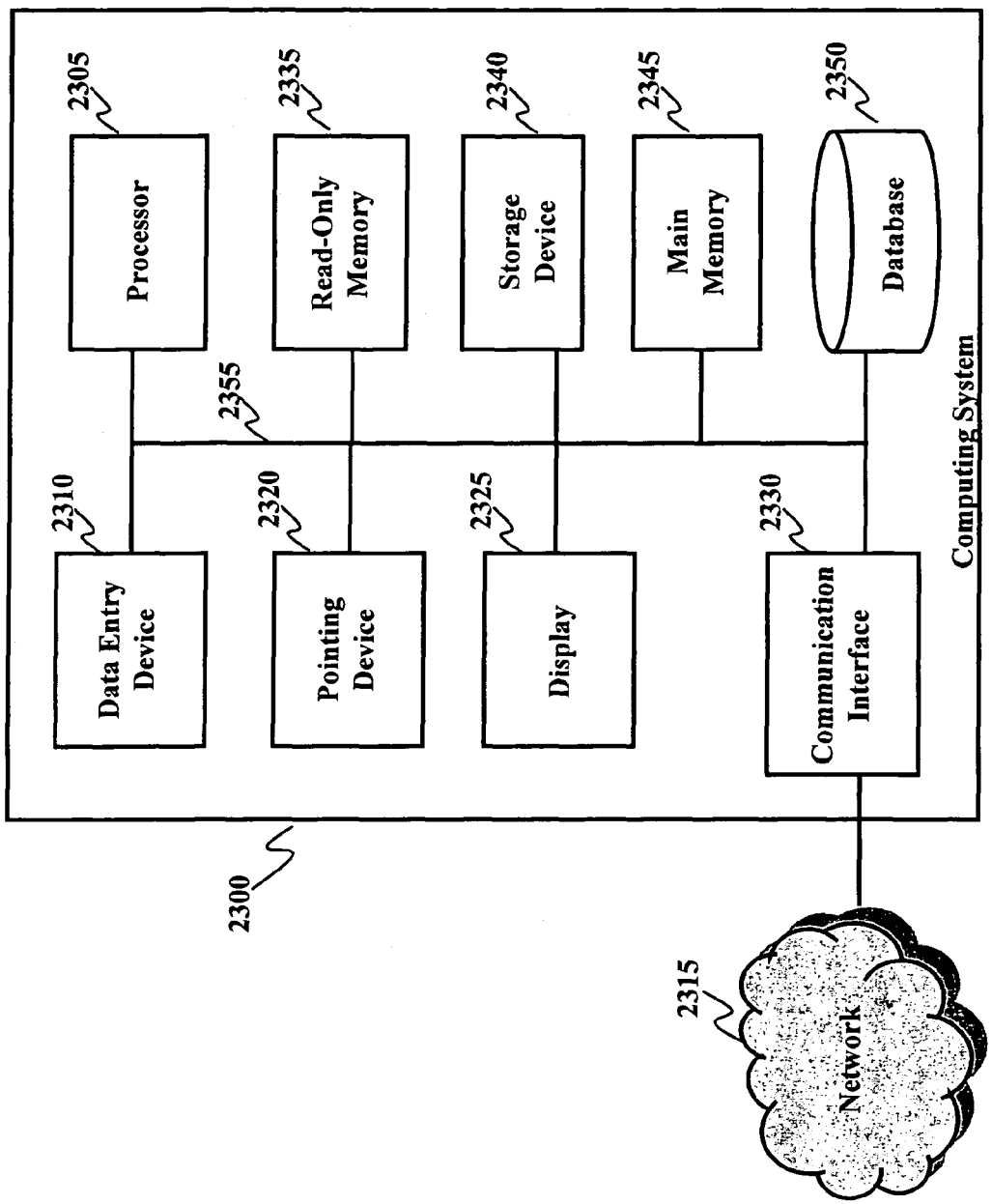
FIG. 23 is a block diagram of a computer system that may be used to implement the computing platform for a server that supports a margin management service, according to an embodiment.

At least one embodiment relates to the use of a computer system for client margin management using a server. FIG. 23 is a block diagram of a computer system 2300 that may be used in at least one embodiment to implement the computing platform for the server 2035. The computing system 2300 may be implemented as or include one or more personal computers, workstations, handheld personal data assistants, Internet appliances (e.g., a computer with minimal memory, disk storage and processing power designed to connect to a network, especially the Internet, etc.), or controllers. The computer system 2300 may include a bus 2355 or other communication mechanism for communicating information, and a processor 2305 coupled with the bus 2355 for processing information. The computer system 2300 also may include a main memory 2345, such as a Random Access Memory (RAM) or other dynamic storage device, coupled to the bus 2355 for storing information and instructions to be executed by the processor 2305. The main memory 2345 also may be used for storing temporary variable or other intermediate information during execution of instructions to be executed by the processor 2305.

The computer system 2300 further may include a Read-Only Memory (ROM) 2335 or other static storage device coupled to the bus 2355 for storing static information and instructions for the processor 2305. A storage device 2340, such as a magnetic disk or optical disk, may be provided and coupled to the bus 2355 for storing information and instructions.

The processor 2305 may fetch the instructions, decode them, and act or instruct other elements 2310-2360 to, for example, transfer data to or from the memory 2345 or to work in combination with the data entry device 2310 or the display 2325 (for example, to input or output data), etc. The processor 2305 may actually be implemented as more than one processor. It should be appreciated that the processor 2305 may be implemented as a general purpose microprocessor, for example, in a central processing unit, a micro controller, or other similar device.

A database 2350 may be coupled to the bus 2355 for storing static information and software instructions. Information stored in or maintained using the database 2350 may be provided in conformance with a database management system format such as, but not limited to, the SQL format. The database 2350 may be a SQL database provided by the Oracle® Corporation of Redwood Shores, Calif. Alternatively, the database 2350 may be a SQL Server 7.0 database supporting the ADO and ODBC protocols provided by IBM® Corporation or Sybase® Corporation. The database 2350 may include information including, but not limited to, database query and access instructions in the form of one or more scripts which, when executed by a processor such as the processor 2305, serve to store and retrieve data maintained using the database 2350 according to the instructions contained in the script, and in particular regarding the data fields to be accessed, as well as their arrangement, provided in the response to the processor 2305.

According to at least one embodiment, margin management as described herein may be provided by the computer system 2300 in response to the processor 2305 executing one or more sequences of instructions contained in the main memory 2345. Such instructions may be read into the main memory 2345 from another computer-readable medium, such as the storage device 2340 or the database 2350. Execution of the sequences of instructions contained in the main memory 2345 may cause the processor 2305 to perform the process steps described herein. One or more processors in a multi-processing arrangement may also be employed to execute the sequences of instructions contained in the main memory 2345. Alternatively, hard-wired circuitry may be used in place of or in combination with software instructions to implement the invention. Thus, embodiments of the invention are not limited to any specific combination of hardware circuitry and software.

The computer system 2300 may be coupled via the bus 2355 to a display 2325 for outputting information to a computer user. In one embodiment, the display 2325 may be a Cathode Ray Tube (CRT) computer display monitor capable of displaying information using multiple colors. Alternatively, the display 2325 may be a liquid crystal display, a monochrome monitor, a web-enabled wireless terminal or handheld terminal such as, for example, a Personal Digital Assistant (PDA). The computer system 2300 may include other output devices as well such as, but not limited to, a printer.

A data entry device 2310, including alphanumeric and other keys, may be coupled to the bus 2355 for communicating information and command selections to the processor 2305. Another type of user input device which may be coupled to the bus 2355 is a pointing device 2320, which may be a computer mouse, trackball, cursor direction keypad, tactile directional finger pad, or other such device for allowing a user to control cursor location and movement on the display 2325, and for communicating direction information and command selections to the processor 2305. This pointing device 2320 typically has two degrees of freedom in two axes, a first axis (e.g., x) and a second axis (e.g., y), that allows the pointing device to specify positions in a plane.

The term "computer-readable medium" as used herein refers to any medium that participates in providing instructions to the processor 2305 for execution. Such a medium may take many forms, including, but not limited to, non-volatile media and volatile media. Non-volatile media include, for example, optical or magnetic disks, such as the storage device 2340. Volatile media include dynamic memory, such as the main memory 2345. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other medium from which a computer can read.

Various forms of computer-readable media may be involved in carrying one or more sequences of one or more instructions to the processor 2305 for execution. For example, the instructions may initially be borne on a magnetic disk of a remote computer. The remote computer may load the instruction into its dynamic memory and send the instructions over a telephone line using a modem. A modem local to the computer system 2300 may receive the data on the telephone line and use an infrared transmitter to convert the data to an infrared signal and place the data on the bus 2355. The bus 2355 may carry the data to the main memory 2345, from which the processor 2305 retrieves and executes the instructions. The instructions received by the main memory 2345 may optionally be stored on the storage device 2340 either before or after execution by the processor 2305.

The computer system 2300 may also include a communication interface 2330 coupled to the bus 2355. The communication interface 2330 may provide a two-way data communication coupling to the network 2315. For example, the communication interface 2330 may be a modem or an Integrated Services Digital Network (ISDN) card to provide a data communication connection to a corresponding type of telephone line. As another example, the communication interface 2330 may be a LAN card to provide a data communication connection to a compatible LAN. Wireless links may also be implemented. In any such implementation, the communication interface 2330 sends and receives electrical, electromagnetic, or optical signals that carry digital data streams representing various types of information.

The communication interface 2330 may provide data communication through one or more networks to other data devices. For example, the communication interface 2330 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams. These signals are exemplary forms of carrier waves transporting the information.

The communications interface 2330 may include Ethernet interface or a LAN communication card, a dial-up modem interface using the PSTN, an intranet, or any combination thereof.

The computer system 2300 may send messages and receive data, including program codes, through the network(s) and the communication interface 2330. In the Internet example, a server might transmit a requested code for an application program through the Internet, ISP, and the communication interface 2330. One such downloaded application may, for example, provide for event monitoring as described herein. The received code may be executed by the processor 1405 as it is received, and/or stored in the storage device 2340, or other non-volatile storage for later execution.

The server 2035 may receive commands and data from the clients' terminals (e.g., 2010a) and output program code and data to the client terminals 2010a using the network 2315. In an embodiment, the server 2035 may generate and transmit the requested information to the requesting user via Hypertext Transfer Markup Language (HTML) formatted or eXtensible Markup Language (XML) formatted pages, which may be provided as World Wide Web pages, using the network 2315. As described previously, the network 2315 may be, for example, a network of interconnected networks such as the Internet, a LAN, a WAN, an intranet including any of these, and/or the PSTN. Interactive pages transmitted and received using the network 2315 may conform to the SSL protocol.

The communications interface 2330 may further include a web browser or a so-called thin client. A thin client may be a client portion of an application designed to require little memory so that the bulk of the data processing occurs on a corresponding server. In at least one embodiment, a thin client may be Java-based. The web browser displays data and is capable of communicating with other computers via a network such as, for example, the Internet or an intranet. The web browser provides a user with a way to navigate, via, for example, hyperlinks which are selected by the pointing device 2320 such as a computer mouse, or as typed in by the user. The web browser uses a protocol such as, for example, HTTP or File Transfer Protocol (FTP), to transmit data of various content such as, for example, HTML formatted documents, plain text documents, graphic images, and XML documents for presentation to the user via the display 2325. Web pages formatted in accordance with HTML or XML may also be provided in accordance with the eXtensible Style Language (XSL) specification available from the World Wide Web Consortium. XSL is useful for separating style from content as well as for providing a common interface for sharing of web pages across applications. The web browser may also run or execute programs, such as Java applets including sequences of instructions provided in accordance with the Java programming language, or JavaScript. The web browser may be, for example, Internet Explorer® by Microsoft® Corporation, Netscape Navigator® by Netscape®, America Online® browser, or any other web browser. A thin client may utilize a two or more tiered client server model. In this model, the client may run a minimal set of services that provide functionality to interface with at least one server. A web browser may be a thin client. The server 2035 may run, for example, the Windows® NT network operating system available from Microsoft® Corporation of Redmond, Wash.

Instructions executed by the processor 2305 from the main memory 2345 may include, for example, application software instructions that cause the processor 2305 to perform operations as described herein. These application instructions may be implemented in the form of source code statements provided in accordance with, for example, the Visual C++® and Visual Basic® higher order programming languages, development kits for which are available from Microsoft® Corporation of Redmond, Wash. Application instructions may also include database scripts for accessing, storing, or selectively retrieving information contained in the database 2350. The database scripts may be contained in the storage device 2340 or may be stored using the database 2350. The database scripts may be implemented in the form of programming statements provided in accordance with, for example, SQL version 7.0 database management system query language, as well as the IBM DB2® system. Other database implementations are possible, including those available from Oracle® or Transact SQL in accordance with the ColdFusion® database management system.

Application software instructions may include a user interface portion, which may be a Graphical User Interface (GUI) portion, for generating interactive pages or display screens by which a user may provide data to and receive information from the computer system 2300 and the database 2350 using a human-machine interface such as, but not limited to, the display 2325. Interactive pages may include user dialog boxes for accepting user-entered information. In particular, the GUI portion may prompt the user to enter data by providing an interactive dialog box or message box instructing the user to enter particular data, or to select from among a multitude of options provided using a pull-down menu. The human-machine interface may also include a hardcopy-generating device such as a printer. A user may interact with the computer system 2300 via the graphical user interface provided by the GUI portion by using the pointing device 2320 and the data entry device 2310. The GUI portion may place the output of the computer system 2300 in a format for presentation to a user via the display 2325. In at least one embodiment, the GUI may be implemented as a sequence of Java instructions such as, for example, Java Swing® instructions. Java Swing® is part of the Java™ Foundation Classes (JFC) in the Java™ platform. The JFC encompasses a group of features to aid in the development of GUIs. Swing® provides all the components from buttons to split panes and tables. The Java™ classes and logic of the GUI may be implemented in Java™.

In particular, a user may select a particular data entry field of an interactive display page presented using the display 2325 by using the pointing device 2320 or the data entry device 2310 to select that field. Upon selecting a field, a user may then enter information into the data entry field using the data entry device 2310. After the user has entered data into the data entry field, the user may cause the GUI portion to input the user-entered information to the computer system 2300 using the pointing device 2320 to select a corresponding display icon or command button.

Thus, a client terminal (e.g., 2010a) may send messages and receive data through the network(s) 2315 and the communications interface 2330. In at least one embodiment, a client terminal might transmit a requested code for an application program through the Internet, ISP, and/or the communication interface. In accordance with at least one embodiment, one such downloaded application provides for user interaction with the margin management service application 2040 using the interactive displays or interactive pages described herein. The received code may be executed by the processor 2305 as it is received, and/or stored in a non-volatile storage device for later execution.

The server 2035 may receive commands and data from the client terminals 2010 and output program code and data to the terminals 2010 using the network 2315. In at least one embodiment, the server 2035 may generate and transmit the requested data to the requesting user via HTML formatted or XML formatted pages, which may be provided as World Wide Web pages, using the network 2315. The network 2315 may be, for example, a network of interconnected networks such as the Internet, a LAN, a WAN, an intranet including any of these, and/or a PSTN. The communications interface 2330 may further include a web browser or thin client. A thin client is a client portion of an application designed to require little memory so that the bulk of the data processing occurs on a corresponding server. In at least one embodiment, a thin client may be Java-based. The web browser may be configured to display data and communicate with other computers via a network such as, for example, the Internet or an intranet. The web browser may provide a user with a way to navigate, via, for example, hyperlinks, which may be selected by the pointing device (such as a computer mouse), or as typed in by the user. The web browser uses a protocol such as, for example, HTTP or FTP, to transmit data of various content such as, for example, HTML formatted documents, plain text documents, graphic images, and XML documents for output presentation to the user via the display.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A computer readable non-transitory medium containing a set of computer readable instructions that when executed on a computing device performs the steps of:
    receiving through an electronic user interface a first margin inquiry request, the first margin inquiry request comprising margin inquiry parameters used to calculate first margin information relating to at least one financial account;
    calculating the first margin information for the at least one financial account based on at least the margin inquiry parameters of the first margin inquiry request;
    detecting a violation of a margin requirement in the at least one financial account from the first margin information;
    presenting the first margin information, including information corresponding to the detected violation, through the electronic user interface;
    receiving through the electronic user interface a second margin inquiry request, the second margin inquiry request comprising parameters defining a proposed transaction to cure the violation detected in the at least one financial account;
    calculating second margin information based on at least the parameters of the second margin inquiry request; and
    presenting the second margin information through the electronic user interface relating to the proposed transaction for curing the violation.

2. The computer readable non-transitory medium of claim 1, where wherein the margin inquiry parameters comprise rules used to calculate the first margin information, the rules including least one of in-house rules or government rules.

3. The computer readable non-transitory medium of claim 1, where wherein:
    the margin inquiry parameters comprise transaction information concerning any transaction or transactions to which the first margin inquiry request is directed, the transaction information including a price or prices of a security or securities to be used to calculate the first margin information, the prices including market prices, intraday prices, and hypothetical prices; and
    the first margin information includes at least one of a dollar amount requirement to be imposed on the transactions to which the first margin inquiry request is directed, margins associated with a special memorandum account, an excess value, and an equity amount.

4. The computer readable non-transitory medium of claim 3, where the excess value includes:
    cash account excess; and
    house maintenance excess.

5. The computer readable non-transitory medium of claim 3, where the equity amount includes:
    cash account balance; and
    net margin equity.

6. The computer readable non-transitory medium of claim 1, where the first margin inquiry request seeks to assess the impact of changing one or more of the margin inquiry parameters.

7. The computer readable non-transitory medium of claim 1, where the first margin inquiry request seeks to assess the impact of changing one or more rules used to calculate the first margin information.

8. A computer-implemented system for managing margin accounts comprising:
    a computing device, the computing device having one or more processors, the one or more processors configured to:
    receive through an electronic user interface a first margin inquiry request, the first margin inquiry request comprising margin inquiry parameters used to calculate first margin information relating to at least one financial account;
    calculate the first margin information for the at least one financial account based on at least the margin inquiry parameters of the first margin inquiry request
    detect a violation of a margin requirement in the at least one financial account from the first margin information;
    present the first margin information, including information corresponding to the detected violation, through the electronic user interface;
    receive through the electronic user interface a second margin inquiry request, the second margin inquiry request comprising parameters defining a proposed transaction to cure the violation detected in the at least one financial account;
    calculate second margin information based on at least the parameters of the second margin inquiry request; and present the second margin information through the electronic user interface relating to the proposed transaction for curing the violation.

9. The computer-implemented system of claim 8, wherein the margin inquiry parameters comprise rules used in calculating the first margin information, the rules including at least one of in-house rules or government rules.

10. The computer-implemented system of claim 8, wherein:
   the margin inquiry parameters comprise transaction information concerning any transaction or transactions to which the first margin inquiry request is directed, the transaction information including a price or prices of a security or securities to be used to calculate the first margin information, the prices including market prices, intraday prices, and hypothetical prices; and
   the first margin information includes at least one of a dollar amount requirement to be imposed on the transaction or transactions to which the first margin inquiry request is directed, margins associated with a special memorandum account, an excess value, and an equity amount.

11. The computer-implemented system of claim 10, where the excess value includes:
   cash account excess; and
   house maintenance excess.

12. The computer-implemented system of claim 10, where the equity amount includes:
   cash account balance; and
   net margin equity.

13. The computer-implemented system of claim 8, where the first margin inquiry request seeks to assess the impact of changing one or more of the margin inquiry parameters.

14. The computer-implemented system of claim 8, where the first margin inquiry request seeks to assess the impact of changing one or more rules used in calculating the first margin information.

* * * * *

UNITED STATES PATENT AND TRADEMARK OFFICE
CERTIFICATE OF CORRECTION

| | | |
|---|---|---|
| PATENT NO. | : 7,966,236 B2 | Page 1 of 1 |
| APPLICATION NO. | : 10/885321 | |
| DATED | : June 21, 2011 | |
| INVENTOR(S) | : Carla Noriega et al. | |

It is certified that error appears in the above-identified patent and that said Letters Patent is hereby corrected as shown below:

IN THE CLAIMS:

In Claim 2, Column 26, Line 12, insert the word --at-- before the word "least"

In Claim 3, Column 26, Line 14, delete the word "where"

Signed and Sealed this
Thirtieth Day of August, 2011

David J. Kappos
*Director of the United States Patent and Trademark Office*